(12) United States Patent
Yang et al.

(10) Patent No.: US 12,080,106 B2
(45) Date of Patent: Sep. 3, 2024

(54) ELECTRONIC DEVICE AND METHOD FOR PREVENTING FINGERPRINT THEFT USING EXTERNAL DEVICE

(71) Applicant: Samsung Electronics Co., Ltd., Suwon-si (KR)

(72) Inventors: Hyeongwook Yang, Suwon-si (KR); Dasom Lee, Suwon-si (KR); Yongha Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/470,869

(22) Filed: Sep. 20, 2023

(65) Prior Publication Data

US 2024/0029477 A1    Jan. 25, 2024

Related U.S. Application Data

(63) Continuation of application No. PCT/KR2023/010514, filed on Jul. 20, 2023.

(30) Foreign Application Priority Data

Jul. 25, 2022    (KR) .................. 10-2022-0091693
Sep. 15, 2022    (KR) .................. 10-2022-0116464

(51) Int. Cl.
*G06V 40/13*    (2022.01)
*G06V 20/20*    (2022.01)
(Continued)

(52) U.S. Cl.
CPC .............. *G06V 40/67* (2022.01); *G06V 20/20* (2022.01); *G06V 40/1306* (2022.01); *G06V 40/1365* (2022.01)

(58) Field of Classification Search
CPC ............... G06V 40/67; G06V 40/1306; G06V 40/1365; G06V 20/20
See application file for complete search history.

(56) References Cited

U.S. PATENT DOCUMENTS

| 8,430,310 B1 * | 4/2013 | Ho | .......................... G06F 21/35 235/382 |
|---|---|---|---|
| 10,863,084 B2 | 12/2020 | Tran et al. | |

(Continued)

FOREIGN PATENT DOCUMENTS

| CN | 106779683 A | 5/2017 |
|---|---|---|
| CN | 111859336 A | 10/2020 |

(Continued)

OTHER PUBLICATIONS

International Search Report dated Oct. 13, 2023, issued in International Patent Application No. PCT/KR2023/010514.

*Primary Examiner* — Stephen G Sherman
(74) *Attorney, Agent, or Firm* — Jefferson IP Law, LLP

(57) ABSTRACT

An electronic device is provided. The electronic device includes a display, a communication module, a memory, and at least one processor configured to be operatively connected to the display, the communication module, and the memory. The at least one processor may be configured to detect an occurrence of an event for executing a remaining fingerprint theft prevention service. The at least one processor may be configured to receive remaining fingerprint candidate group data corresponding to a fingerprint candidate area. The at least one processor may be configured to determine authentication validity of the fingerprint candidate area. The at least one processor may be configured to transmit a security level obtained by evaluating a security risk of remaining fingerprints remaining on the display. The at least one processor (Continued)

may be configured to output security guidance information on the remaining fingerprints of the display.

20 Claims, 11 Drawing Sheets

(51) Int. Cl.
*G06V 40/12* (2022.01)
*G06V 40/60* (2022.01)

(56) References Cited

U.S. PATENT DOCUMENTS

| | | |
|---|---|---|
| 11,538,242 B2 | 12/2022 | LaMont |
| 2004/0026635 A1 | 2/2004 | Lee et al. |
| 2004/0252869 A1 | 12/2004 | Kondo et al. |
| 2010/0239823 A1 | 9/2010 | Tho et al. |
| 2011/0213664 A1* | 9/2011 | Osterhout ............... G06F 3/013 705/14.58 |
| 2018/0074643 A1 | 3/2018 | Tushar Balasaheb |
| 2020/0250284 A1 | 8/2020 | Diehl et al. |
| 2021/0365664 A1 | 11/2021 | Lee et al. |
| 2022/0230011 A1 | 7/2022 | Wan et al. |
| 2022/0309782 A1* | 9/2022 | Wei ..................... G06V 40/155 |

FOREIGN PATENT DOCUMENTS

| | | |
|---|---|---|
| CN | 213522050 U | 6/2021 |
| CN | 114489322 A | 5/2022 |
| CN | 116414222 A | 7/2023 |
| JP | H06-162175 A | 6/1994 |
| KR | 10-0333138 B1 | 4/2002 |
| KR | 10-1059886 B1 | 8/2011 |
| KR | 10-2012-0042684 A | 5/2012 |
| KR | 10-1576557 B | 12/2015 |
| KR | 10-2009000 B1 | 8/2019 |
| WO | 2015/085434 A1 | 6/2015 |

* cited by examiner

<10001>

<10002>

ELECTRONIC DEVICE AND METHOD FOR PREVENTING FINGERPRINT THEFT USING EXTERNAL DEVICE

CROSS-REFERENCE TO RELATED APPLICATION(S)

This application is a continuation application, claiming priority under § 365(c), of an International application No. PCT/KR2023/010514, filed on Jul. 20, 2023, which is based on and claims the benefit of a Korean patent application number 10-2022-0091693, filed on Jul. 25, 2022, in the Korean Intellectual Property Office, and of a Korean patent application number 10-2022-0116464, filed on Sep. 15, 2022, in the Korean Intellectual Property Office, the disclosure of each of which is incorporated by reference herein in its entirety.

TECHNICAL FIELD

The disclosure relates to an electronic device and method for preventing fingerprint theft using an external device.

BACKGROUND ART

An electronic device may provide a function of authenticating a user using a user's biometric information to enhance security. The biometric information may include a user's biometric characteristics, such as fingerprints, iris, voice, face, or veins. Fingerprint recognition is a commonly used technology in biometric authentication, which may acquire a user's fingerprint image through a fingerprint sensor and determine whether the user is authenticated by comparing the acquired user's fingerprint image with a pre-registered fingerprint image.

With the recent release of electronic devices in a form of a full-front screen that uses an entire front surface as a display, there is a trend to mount a fingerprint recognition function (e.g., fingerprint on display {FOD} or in-display fingerprint) through a display. In an electronic device, a fingerprint recognition sensor may be disposed inside a display (or at a bottom or under panel) and fingerprints that are brought into contact with or touches the front surface (e.g., a display image) of the display in an area where the fingerprint recognition sensor is disposed may be recognized.

As a result of multiple attempts at fingerprint authentication or using the electronic device, remaining fingerprints may be left on the entire display surface.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Solution

Aspects of the disclosure are to address at least the above-mentioned problems and/or disadvantages and to provide at least the advantages described below. Accordingly, an aspect of the disclosure is to provide an electronic device and method for preventing fingerprint theft using external device.

Additional aspects will be set forth in part in the description which follows and, in part, will be apparent from the description, or may be learned by practice of the presented embodiments.

In accordance with an aspect of the disclosure, an electronic device is provided. The electronic device includes a display, a communication module, a memory, and at least one processor configured to be operatively connected to the display, the communication module, and the memory. The at least one processor may be configured to detect, in a state of being wirelessly connected to an augmented reality (AR) device through the communication module, an occurrence of an event for executing a remaining fingerprint theft prevention service that is in conjunction with the AR device. The at least one processor may be configured to receive, from the AR device through the communication module, remaining fingerprint candidate group data corresponding to a fingerprint candidate area acquired from a display front image of the electronic device captured by a camera of the AR device. The at least one processor may be configured to determine authentication validity of the fingerprint candidate area by matching the remaining fingerprint candidate group data with a fingerprint authentication template registered in the electronic device. The at least one processor may be configured to transmit, to the AR device through the communication module, a security level obtained by evaluating a security risk of remaining fingerprints remaining on the display of the electronic device as a result of the authentication validity. The at least one processor may be configured to output security guidance information on the remaining fingerprints of the display as an AR service through the AR device.

In accordance with another aspect of the disclosure, a fingerprint theft prevention method using the external device is provided. The fingerprint theft prevention method includes detecting, in a state of being wirelessly connected to an augmented reality (AR) device through the communication module, an occurrence of an event for executing a remaining fingerprint theft prevention service that is in conjunction with the AR device. The fingerprint theft prevention method comprises receiving, from the AR device through the communication module, remaining fingerprint candidate group data corresponding to a fingerprint candidate area acquired from a display front image of the electronic device captured by a camera of the AR device. The fingerprint theft prevention method comprises determining authentication validity of the fingerprint candidate area by matching the remaining fingerprint candidate group data with a fingerprint authentication template registered in the electronic device. The fingerprint theft prevention method comprises transmitting, to the AR device through the communication module, a security level obtained by evaluating a security risk of remaining fingerprints remaining on the display of the electronic device as a result of the authentication validity. The fingerprint theft prevention method comprises outputting security guidance information on the remaining fingerprints of the display as an AR service through the AR device.

In accordance with another aspect of the disclosure, a non-transitory computer-readable storage medium is provided. The non-transitory computer-readable storage medium includes instructions for causing at least one processor of the electronic device to detect, in a state of being wirelessly connected to an augmented reality (AR) device through the communication module, an occurrence of an event for executing a remaining fingerprint theft prevention service that is in conjunction with the AR device. The storage medium stores instructions for causing the at least one processor to receive, from the AR device through the communication module, remaining fingerprint candidate group data corresponding to a fingerprint candidate area acquired from a display front image of the electronic device captured by a camera of the AR device. The storage medium stores instructions for causing the at least one processor 420 to determine authentication validity of the fingerprint candidate area by matching the remaining fingerprint candidate group data with a fingerprint authentication template registered in the electronic device. The storage medium stores instructions for causing the at least one processor to transmit, to the AR device through the communication module, a security level obtained by evaluating a security risk of remaining fingerprints remaining on the display of the electronic device as a result of the authentication validity. The storage medium stores instructions for causing the at least one processor to output security guidance information on the remaining fingerprints of the display as an AR service through the AR device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

Figure 1:
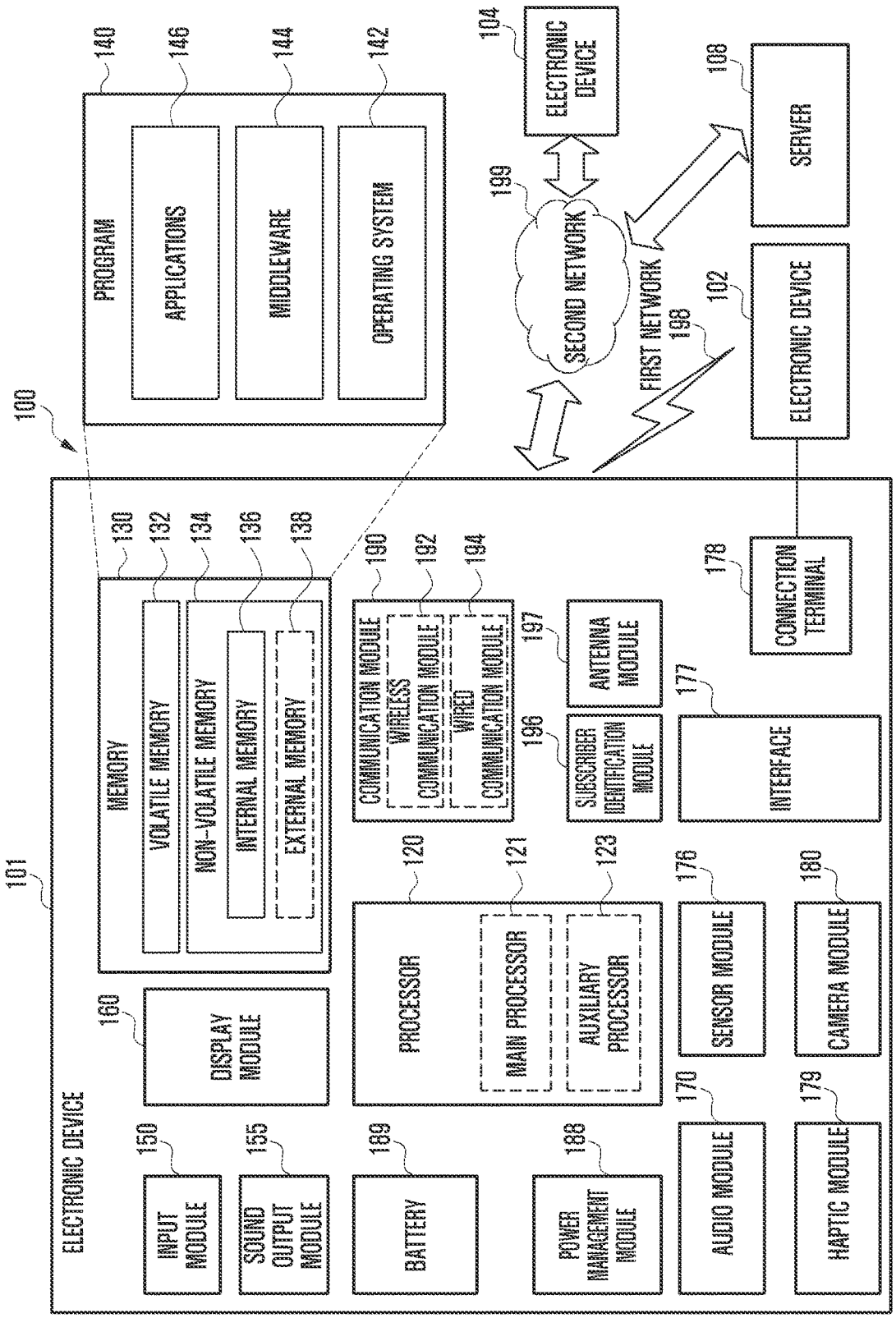
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to one embodiment, the electronic device 101 may communicate with the electronic device 104 via the server 108. According to another embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In other embodiments, some of the components may be implemented as single integrated circuitry. In an example, the sensor module 176 (e.g., a fingerprint sensor, an iris sensor, or an illuminance sensor) may be implemented as embedded in the display device 160 (e.g., a display).

The processor 120 may be configured to execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to another embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, a communication processor (CP), and the like) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). In an embodiment, the auxiliary processor 123 (e.g., an image signal processor or a communication processor) may be implemented as part of another component (e.g., the camera module 180 or the communication module 190) functionally related to the auxiliary processor 123. In another embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, reinforcement learning, and the like. The artificial intelligence model may include a plurality of artificial neural network layers. In yet another embodiment, the artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may be configured to store various data used by at least one component (e.g., the processor 120 or the sensor module 176) of the electronic device 101. The various data may include, for example, software (e.g., the program 140) and input data or output data for a command related thereto. The memory 130 may, for example, include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. In another embodiment, the input module 150 may include, for example, a microphone, a mouse, a keyboard, a key (e.g., a button), or a digital pen (e.g., a stylus pen).

The sound output module 155 may output sound signals to the outside of the electronic device 101. In another embodiment, the sound output module 155 may include, for example, a speaker or a receiver. The speaker may be used for general purposes, such as playing multimedia or playing record. The receiver may be used for receiving incoming calls. According to yet another embodiment, the receiver may be implemented as separate from, or as part of the speaker.

The display module 160 may visually provide information to the outside (e.g., a user) of the electronic device 101. In another embodiment, the display module 160 may include, for example, a display, a hologram device, or a projector and control circuitry to control a corresponding one of the display, hologram device, and projector. The display module 160 may, for example, include a touch sensor adapted to detect a touch, or a pressure sensor adapted to measure the intensity of force incurred by the touch.

The audio module 170 may convert a sound into an electrical signal and vice versa. According to another embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, and the like.

The interface 177 may support one or more specified protocols to be used for the electronic device 101 to be coupled with the external electronic device (e.g., the electronic device 102) directly (e.g., wiredly) or wirelessly. According to another embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). In another embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. In another embodiment, the haptic module 179 may include, for example, a motor, a piezoelectric element, or an electric stimulator.

The camera module 180 may capture a still image or moving images. The camera module 180 may, for example, include one or more lenses, image sensors, image signal processors, or flashes.

The power management module 188 may manage power supplied to the electronic device 101. The power management module 188 may, for example, be implemented as at least part of, for example, a power management integrated circuit (PMIC).

The battery 189 may supply power to at least one component of the electronic device 101. According to one embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. In another embodiment, the communication module 190 may include one or more communication processors that are operable independently from the processor 120 (e.g., the application processor (AP)) and supports a direct (e.g., wired) communication or a wireless communication. According to yet another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may, for example, identify and authenticate the electronic device 101 in a communication network, such as the first network 198 or the second network 199, using subscriber information (e.g., international mobile subscriber identity (IMSI)) stored in the subscriber identification module 196).

The wireless communication module 192 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). In another embodiment, the wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. In still another embodiment, the wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may be configured to transmit or receive a signal or power to or from the outside (e.g., the external electronic device) of the electronic device 101. According to one embodiment, the antenna module 197 may include an antenna including a radiating element composed of a conductive material or a conductive pattern formed in or on a substrate (e.g., a printed circuit board (PCB)). According to another embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to yet another embodiment, another component (e.g., a radio frequency integrated circuit (RFIC)) other than the radiating element may be additionally formed as part of the antenna module 197.

According to some embodiments, the antenna module 197 may form a mmWave antenna module. In an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI).

Commands or data may be transmitted or received between the electronic device 101 and the external electronic device 104 via the server 108 coupled with the second network 199. Each of the electronic devices 102 or 104 may be a device of a same type as, or a different type, from the electronic device 101. According to another embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may, for example, provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to still another embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
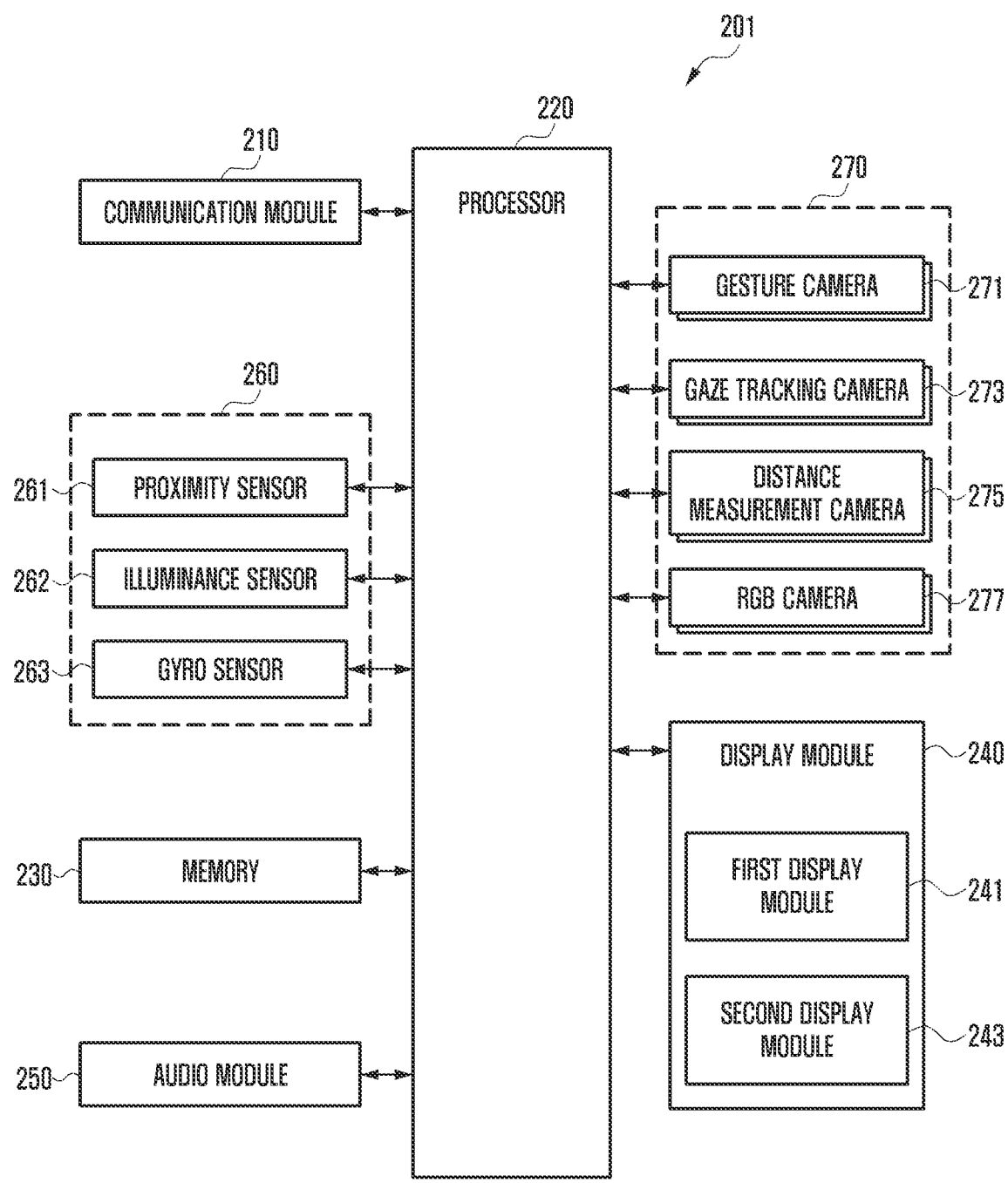
FIG. 2 is a block diagram illustrating an AR device according to an embodiment of the disclosure.

FIG. 2 is a block diagram illustrating an AR device 201 according to an embodiment of the disclosure.

Referring to FIG. 2, according to some embodiments, an augmented reality (AR) device 201 that provides a user with an image related to an AR service may be configured in the form of at least one of glasses, goggles, a helmet, or a hat, but is not limited thereto. In an example, the AR device 201 may be a head-mounted device (HMD), a head-mounted display (HMD), or AR glasses.

In an embodiment, the AR device 201 may provide an AR service in conjunction with an electronic device 101 (or a host device or a controller device) (e.g., the electronic device 101 of FIG. 1).

In another embodiment, the AR device 201 may provide an AR service that outputs at least one virtual object so that the at least one virtual object appears overlapping with an area determined by a user's field of view (FoV). The area determined, for example, by the user's field of view is an area determined to be perceptible by the user through the AR device 201, and may include all or at least a portion of a display module 240 of the AR device 201.

In yet another embodiment, the AR device 201 may be at least partially controlled by the electronic device 101 (e.g., the electronic device 101 of FIG. 1), and at least one function may be performed under the control of the electronic device 101 (e.g., the electronic device 101 of FIG. 1).

In still another embodiment, the AR device 201 may include a communication module 210, a processor 220, a memory 230, a display module 240, an audio module 250, a sensor module 260, and a camera module 270. Although not shown in the drawing, the AR device 201 may further include a power management module and a battery.

The communication module 210 (e.g., a wireless communication circuit) may perform communication with the electronic device 101 (e.g., the electronic device 101 of FIG. 1) through a wireless communication network (e.g., a first network 198 of FIG. 1 {e.g., short-distance wireless communication network}) or perform communication with a server device through a long-distance wireless network (e.g., a second network 199 of FIG. 1). In an example, the AR device 201 may perform wireless communication with the electronic device 101 (e.g., the electronic device 101 of FIG. 1) to exchange commands and/or data with each other.

According to one embodiment, the communication module 210 may support a 5G network after a 4G network and a next-generation communication technology, for example, new radio (NR) access technology. The NR access technology may support high-speed transmission of high-capacity data (enhanced mobile broadband {eMBB}), terminal power minimization and connection of multiple terminals (massive machine type communications {mMTC}), or ultra-reliable and low-latency communications (URLLC). The communication module 210 may, for example, support a high frequency band (e.g., mmWave band) to achieve a high data rate. The communication module 210 may support various technologies for securing performance in a high frequency band, for example, beamforming, massive multiple-input and multiple-output (MIMO), full-dimensional MIMO, array antenna, analog beam-forming, or large scale antenna.

According to another embodiment, the display module 240 may display at least one virtual object on at least a portion of the display panel so that the virtual object is added to an image related to a real space acquired through the camera module 270 by a user wearing the AR device 201.

According to various embodiments, the display module 240 may include a first display module 241 corresponding to the left eye of both eyes of the user and/or a second display module 243 corresponding to the right eye of the user.

According to yet another embodiment, the display module 240 may include a transparent or translucent display.

According to still another embodiment, the display module 240 may include a lens. The lens may include a lens having a transparent waveguide. The lens may transmit light output from the display panel to the user's eyes. In an example, light emitted from the display panel may pass through the lens and be transmitted to a user through a waveguide formed in the lens. The waveguide may include at least one of at least one diffractive element (e.g., a diffractive optical element {DOE} or a holographic optical element {HOE}) or a reflective element (e.g., a reflective mirror). In another example, the waveguide may guide display light emitted from a light source unit to the user's eyes by using at least one diffractive element or reflective element. The user may perceive a real space (or real environment) on the rear surface of the display through the display module 240.

The audio module 250 may convert a sound into an electrical signal or convert an electrical signal into a sound based on the control of the processor 220. For example, the audio module 250 may include a speaker and/or a microphone.

In an embodiment, the sensor module 260 may detect the movement of the AR device 201. The sensor module 260 may detect a physical quantity related to the movement of the AR device 201, for example, velocity, acceleration, angular velocity, angular acceleration, or geographic location of the AR device 201.

In another embodiment, the sensor module 260 may include various sensors. In an example, the sensor module 260 may include a proximity sensor 261, an illuminance sensor 262, and/or a gyro sensor 263, but is not limited thereto. The proximity sensor 261 may detect an object adjacent to the AR device 201. The illuminance sensor 262 may measure the level of brightness around the AR device 201. In yet another embodiment, the processor 220 may identify the level of brightness around the AR device 201 using the illuminance sensor 262 and change setting information related to the brightness of the display module 240 based on the level of brightness. The gyro sensor 263 may, for example, detect the state (or attitude or direction) and location of the AR device 201. The gyro sensor 263 may detect the movement of the AR device 201 or a user wearing the AR device 201.

In still another embodiment, the camera module 270 may capture still images and moving images. According to yet another embodiment, the camera module 270 may include one or more lenses, image sensors, image signal processors, or flashes.

The camera module 270 may include at least one of a gesture camera 271, a gaze tracking camera 273, a distance measurement camera 275 (a depth camera), and/or a red, green and blue (RGB) camera 277. According to one embodiment, the gesture camera 271 may detect a user's movement. For example, at least one gesture camera 271 may be disposed in the AR device 201 and may detect a user's hand movement within a predetermined distance. The gesture camera 271 may include a simultaneous localization and mapping (SLAM) camera for recognizing information (e.g., location and/or direction) related to the surrounding space of the AR device 201. The gaze tracking camera 273 may track the movement of the user's left and right eyes. According to another embodiment, the processor 220 may confirm the gaze direction of the left eye and the gaze direction of the right eye using the gaze tracking camera 273. The distance measurement camera 275 may measure a distance to an object located in front of the AR device 201. According to yet another embodiment, the distance measurement camera 275 may include a time of flight (TOF) camera and/or a depth camera. The distance measurement camera 275 may photograph the front direction of the AR device 201, and the gaze tracking camera 273 may photograph a direction opposite the photographing direction of the distance measurement camera 275. The red green blue (RGB) camera 277 may detect color related information of an object and distance information to the object.

According to still another embodiment, the gesture camera 271, the gaze tracking camera 273, the distance measurement camera 275, and/or the RGB camera 277 included in the camera module 270 may be included in the AR device 201, respectively, or some of them may be implemented as an integrated camera. The distance measurement camera 275 and the RGB camera 277 may, for example, be implemented as one integrated camera.

The processor 220 may, for example, execute a program (e.g., the program 140 of FIG. 1) stored in the memory 230 to control at least one other component (e.g., the communication module 210, the display module 240, the audio module 250, the sensor module 260, or the camera module 270) related to the function of the AR device 201, and may perform data processing and operation required for tasks (e.g., AR tasks) related to an AR service. In another example, the processor 220 may include a computation processing unit.

In an embodiment, the processor 220 may acquire image information by capturing an image related to a real space corresponding to the field of view of the user wearing the AR device 201 through the camera module 270. The processor 220 may recognize information corresponding to an area determined by the user's field of view (FoV) among images related to the real space acquired through the camera module 270 of the AR device 201. The processor 220 may generate a virtual object based on virtual information based on the image information. In another embodiment, the processor 220 may display a virtual object related to the AR service together with the image information through the display module 240.

In yet another embodiment, the processor 220 may measure a physical quantity (e.g., geographic location, velocity, acceleration, angular velocity, and angular acceleration of the AR device 201) related to the movement of the AR device 201 through the sensor module 260, and the movement information of the AR device 201 may be obtained using the measurement physical quantity or a combination thereof.

In still another embodiment, the processor 220 may analyze the movement information and image information of the AR device 201 in real time to control to perform AR tasks, for example, a head tracking task, a hand tracking task, and an eye tracking task.

Figure 3:
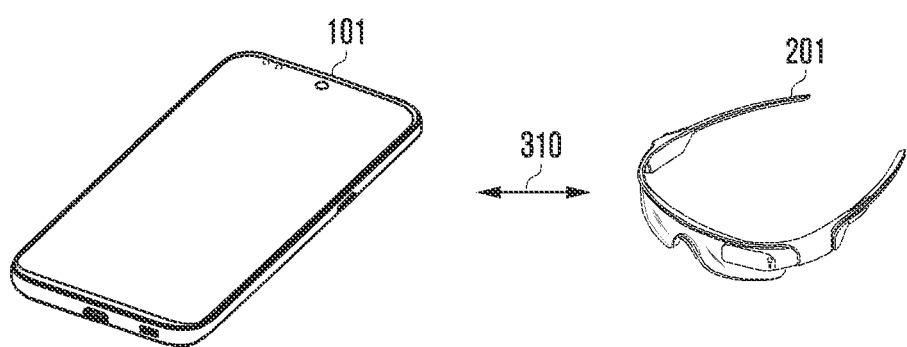
FIG. 3 illustrates a network environment of an electronic device and an AR device according to an embodiment of the disclosure.

FIG. 3 illustrates a network environment of the electronic device 101 and the AR device 201 according to an embodiment of the disclosure.

Referring to FIG. 3, in order to provide an AR service, an electronic device 101 and an AR device 201 may be connected to each other using a wireless communication network 310. The electronic device 101 may be a device that performs wireless communication and performs various calculations for providing an AR service. The electronic device 101 may be, for example, any one of a smartphone, a PC, and a tablet PC, and is not limited to the above example. The AR device 201 may be provided in the form of glasses worn by a user, but is not limited thereto.

According to one embodiment, the wireless communication network 310 may be a short-distance wireless network (e.g., the first network 198 of FIG. 1). The electronic device 101 and the AR device 201 may, for example, be connected to each other using at least one wireless communication method among WiFi-P2P, Bluetooth, and Bluetooth low energy (BLE), but the wireless communication method is not limited thereto.

According to another embodiment, the AR device 201 may transmit various types of information for providing an AR service to the electronic device 101 using the wireless communication network 310. For example, the AR device 201 may acquire location information of the AR device 201, sensor information, and image information obtained by capturing a real environment, and transmit the acquired information to the electronic device 101 in real time.

According to yet another embodiment, the electronic device 101 may receive information (e.g., location information, sensor information, image information obtained by capturing a real environment, and the like) required for providing an AR service by using the wireless communication network 310 from the AR device 201, and generate virtual information and/or a virtual object to be output from the AR device 201 based on the received information to transmit the generated information to the AR device 201.

According to still another embodiment, the AR device 201 may provide an AR service by outputting an image related to the virtual information and/or virtual object transmitted from the electronic device 101 using the wireless communication network 310.

Although not shown in the drawings, the electronic device 101 and the AR device 201 may be communicatively connected to a server (e.g., the server 108 of FIG. 1) using wireless communication. In an embodiment, the server may acquire virtual information for implementing an AR service. The electronic device 101 may receive in real time the location information of the AR device 201, the sensor information, and the image information captured by the AR device 201 which are acquired by the AR device 201 to relay the received information to the server, and the server may acquire virtual information based on the information received from the electronic device 101. According to some embodiments, the server may transmit the acquired virtual information to the electronic device 101, and the electronic device 101 may relay and transmit the received virtual information to the AR device 201.

In another embodiment, the AR device 201 and the electronic device 101 may work in conjunction with each other to support a remaining fingerprint theft prevention service that informs the user of whether the remaining fingerprints are in security risk by determining authentication validity of the remaining fingerprint remaining on the display of the electronic device 101 and evaluating the security risk of the remaining fingerprint.

Hereinafter, components and operations of the electronic device 101 and the AR device 201 that support a remaining fingerprint theft prevention service for the remaining fingerprints remaining on the display of the electronic device 101 will be described in detail.

Figure 4:
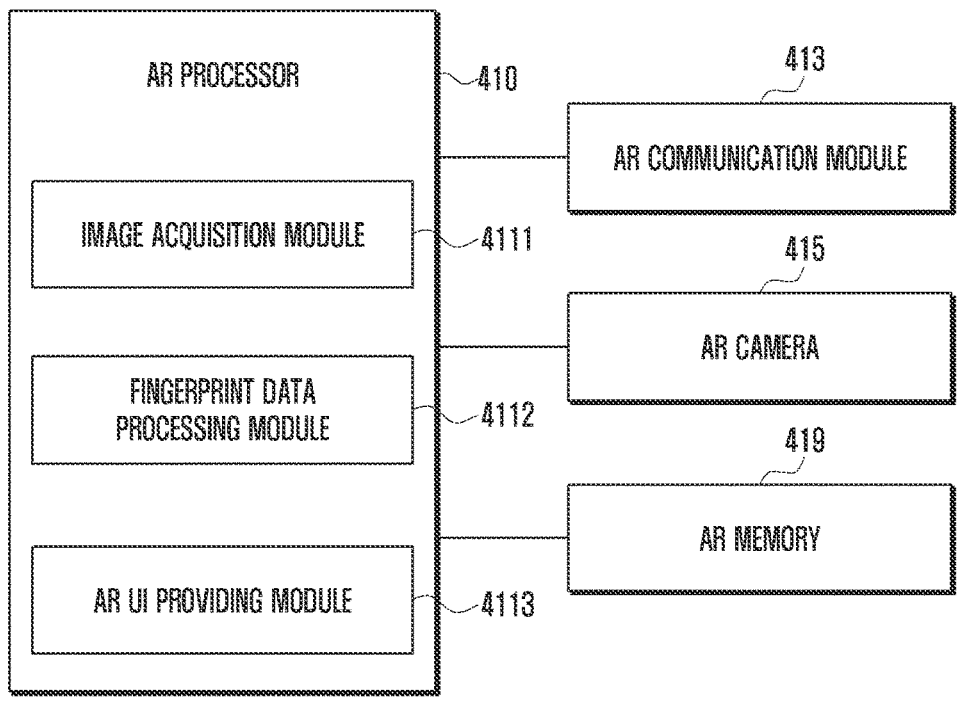
FIG. 4 illustrates schematic components of an electronic device and an AR device according to an embodiment of the disclosure.
Figure 4:
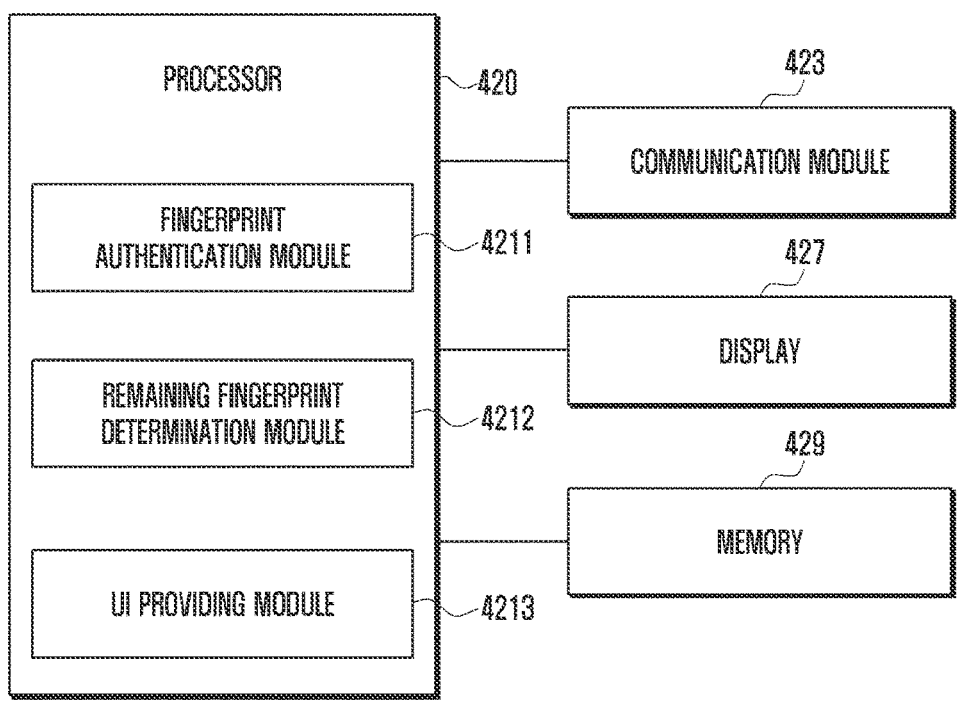

FIG. 4 illustrates schematic components of the electronic device 101 and the AR device 201 according to an embodiment of the disclosure.

Figure 5:
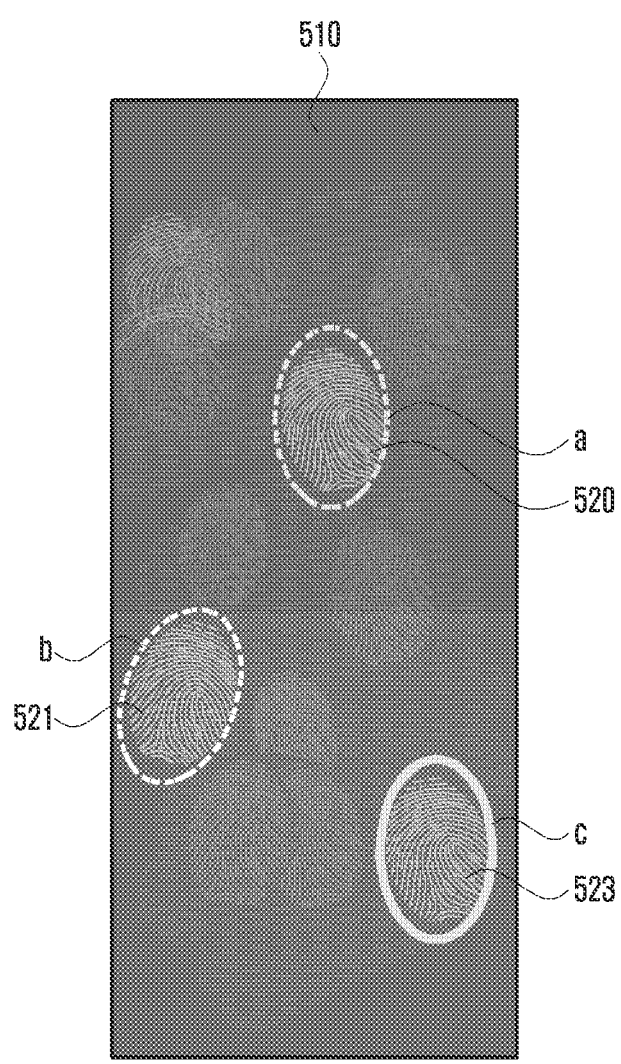
FIG. 5 illustrates an example of detecting remaining fingerprints from a display front image of an electronic device according to an embodiment of the disclosure.

FIG. 5 illustrates an example of detecting remaining fingerprints from a display front image of the electronic device according to an embodiment of the disclosure.

Referring to FIG. 4, according to an embodiment, an AR device (e.g., an AR device 201 of FIG. 2) that supports the service for preventing remaining fingerprints from being stolen may include an AR processor 410 (e.g., a processor 220 of FIG. 2), an AR communication module 413 (e.g., a communication module 210 of FIG. 2), an AR camera 415 (e.g., a camera module 270 in FIG. 2), and an AR memory 419 (e.g., a memory 230 of FIG. 2). The AR device 201 shown in FIG. 4 may have the same components as the AR device 201 shown in FIG. 2 or may further include the components of the AR device 201 shown in FIG. 2. A detailed description of the same components as those in FIG. 2 will be omitted, and operations related to the remaining fingerprint theft prevention service will be described.

According to one embodiment, the AR communication module 413 may transmit and receive signals, data, or information related to the remaining fingerprint theft prevention service to and from the electronic device 101 (e.g., the electronic device 101 or the server 108 of FIG. 1).

According to another embodiment, the AR camera 415 may be a camera that supports fingerprint capture, for example, at least one of an optical sensor, an ultraviolet (UV) camera, or an RGB camera, or a camera that combines them, but is not limited thereto.

According to yet another embodiment, the AR device 201 may execute a camera (e.g., the AR camera) to capture the display of the electronic device 101 in response to a user input or the occurrence of a designated event (e.g., an event for executing a remaining fingerprint theft prevention service). Conditions for executing the AR camera for the remaining fingerprint theft prevention service in the AR device 201 or the electronic device 101 may be configured in various ways. In an example, the event for executing the remaining fingerprint theft prevention service may be one of a time point when the electronic device 101 and the AR device 201 are connected to each other, a time point when a fingerprint authentication attempt was made in the electronic device 101, a time point when fingerprint authentication is performed more than a certain number of times during fingerprint authentication in the electronic device 101, or a time point when the remaining fingerprint theft prevention service function is turned on, but it not limited thereto. An occurrence of the event for executing the remaining fingerprint theft prevention service may be shared between the electronic device 101 and the AR device 201.

According to still another embodiment, the AR camera 415 may capture the front surface of the display of the electronic device 101 and transmit the obtained image of the front surface of the display to the AR processor 410 (or an image acquisition module 4111).

The AR processor 410 may include an image acquisition module 4111, a fingerprint data processing module 4112, and an AR user interface (UI) providing module 4113. According to various embodiments, the AR device 201 may further include at least one of a remaining fingerprint determination module (not shown) and a fingerprint authentication module (not shown). An example in which the AR device 201 includes at least one of the remaining fingerprint determination module and the fingerprint authentication module will be described with reference to FIGS. 8 and 9.

In an embodiment, the AR processor 410 may control the image acquisition module 4111, the fingerprint data processing module 4112, and the AR UI providing module 4113, or may process (or perform) their operations. The AR memory 419 may, for example, store instructions for causing the AR processor 410 to operate the image acquisition module 4111, the fingerprint data processing module 4112, and the AR UI providing module 4113. The instructions may be stored as software on the AR memory 419 and executable by AR processor 410.

In another embodiment, the image acquisition module 4111 may receive a captured image from the AR camera 415. For example, the image acquisition module 4111 may receive the display front image of the electronic device 101 in relation to the remaining fingerprint theft prevention service. The image acquisition module 4111 may transmit the display front image to the fingerprint data processing module 4112.

In still another embodiment, the fingerprint data processing module 4112 may perform image processing (e.g., contrast enhancement) on the display front image to generate an amplitude image (e.g., amplitude fingerprint image including amplitude A(x,y) information indicating a difference in light intensity {e.g., reflectivity or transmittance} in ridge and valley portions).

The fingerprint data processing module 4112 may process the amplitude image into remaining fingerprint candidate group data related to at least one fingerprint candidate area. In yet another embodiment, the fingerprint data processing module 4112 may perform learning (e.g., deep learning) on feature points (e.g., a ridge that rises in the shape of a line, a valley between the ridges, a bifurcation where the ridge diverges, and an ending where the ridge ends) of fingerprints within the amplitude image to detect (or find) a fingerprint candidate area where a fingerprint expression pattern or a fingerprint shape appears, and acquire data of the detected fingerprint candidate area.

Referring to FIG. 5, the fingerprint data processing module 4112 may detect areas having feature points of the fingerprint, for example, a first fingerprint candidate area a, a second fingerprint candidate area b, and a third fingerprint candidate area c from the amplitude image corresponding to a front display image 510. When the feature points cannot be extracted because the fingerprints are unclear, distorted, or overlap each other even if the fingerprints have the fingerprint pattern shape, the fingerprint data processing module 4112 may exclude the corresponding fingerprints from the fingerprint candidate area. The fingerprint data processing module 4112 may, for example, extract data 520 of the first fingerprint candidate area a, extract data 521 of the second fingerprint candidate area b, and extract data 523 of the third fingerprint candidate area c.

According to one embodiment, the fingerprint data processing module 4112 may assign numbers to the fingerprint candidate areas, calculate coordinate information in which each fingerprint candidate area is located within the front display image, and extract data (e.g., feature point data) of each fingerprint candidate area to process the extracted data into remaining fingerprint candidate group data. For example, the remaining fingerprint candidate group data may be configured as in Table 1.

TABLE 1

| 1 | Feature point data of first fingerprint candidate area | First coordinate information |
|---|---|---|
| 2 | Feature point data of second fingerprint candidate area | Second coordinate information |
| 3 | Feature point data of third fingerprint candidate area | Third coordinate information |

In another example, the fingerprint data processing module 4112 may crop the fingerprint candidate area having fingerprint feature points. The AR device 201 may acquire resolution information of the fingerprint recognition sensor of the electronic device 101 when the AR device 201 is connected to the electronic device 101. According to another embodiment, the AR device 201 may configure a crop size of the fingerprint candidate area to a size corresponding to the resolution of the fingerprint recognition sensor of the electronic device 101. The fingerprint data processing module 4112 may acquire cropped images (e.g., a first cropped image corresponding to the first fingerprint candidate region and a second cropped image corresponding to the second fingerprint candidate region) of the fingerprint candidate area detected from the amplitude image, and replace the feature point data with the cropped image to configure the remaining fingerprint candidate group data.

According to yet another embodiment, the fingerprint data processing module 4112 may transmit the remaining fingerprint candidate group data to the AR communication module 413 so that the remaining fingerprint candidate group data is transmitted to the electronic device 101 through the AR communication module 413.

According to still another embodiment, the AR device 201 may transmit the remaining fingerprint candidate group data to the electronic device 101 through the AR communication module 413 and request security risk evaluation according to authentication validity of the remaining fingerprint candidate group data. For example, the electronic device 101 may compare the remaining fingerprint candidate group data transmitted from the AR device 201 with a fingerprint authentication template registered in the electronic device 101 to confirm the authentication validity, and transmit matching information including a security level to the AR device 201.

In an embodiment, when the matching information related to the remaining fingerprint candidate group data is received from the electronic device 101 through the AR communication module 413, the AR UI providing module 4113 may output security guidance information of the remaining fingerprints based on the security level of the fingerprint candidate area as the AR service based on the received matching information. In another embodiment, the security guidance information may be information that induces removal of the remaining fingerprints or information informing about the risk of the remaining fingerprints, or information informing that the remaining fingerprints do not exist.

In an example, the AR UI providing module 4113 may confirm the location of the fingerprint candidate area by referring to the coordinate information of each fingerprint candidate area within a camera preview image (e.g., an image obtained by capturing the front surface {e.g., the display area} of the electronic device 101) executed in conjunction with the electronic device 101, and output virtual information (or a virtual object) for outputting security guidance information (e.g., text such as "This fingerprint can be authenticated", "This fingerprint is highly likely to be authenticated", "Please remove remaining fingerprints", or "There is no fingerprint that can be authenticated") at the location of the remaining fingerprints corresponding to the display of the electronic device 101. In another example, the AR UI providing module 4113 may overlay a UI (e.g., a virtual fingerprint-shaped object or a security risk object) that informs the location of the fingerprint candidate area with a normal or dangerous level of security risk, on the camera preview image and output the overlayed image.

In yet another embodiment, the electronic device 101 (e.g., an electronic device 101 of FIG. 1) supporting the remaining fingerprint theft prevention service may include a processor 420 (e.g., a processor 120 of FIG. 1), a communication module 423 (e.g., a communication module 190 of FIG. 1), a display 427 (e.g., a display module 160 of FIG. 1), and a memory 429 (e.g., a memory 130 of FIG. 1). The electronic device 101 shown in FIG. 4 may have the same components as those in the electronic device 101 shown in FIG. 1 or may further include the components of the electronic device 101 shown in FIG. 1. A detailed description of the same components as those in FIG. 1 will be omitted, and components related to the remaining fingerprint theft prevention service will be described in detail.

In still another embodiment, the electronic device 101 may support an AR service by communicating with the AR device 201 through the communication module 423. The communication module 423 may transmit/receive signals, data, or information related to the remaining fingerprint theft prevention service in conjunction with the AR communication module 413 (or server).

The communication module 423 may receive the remaining fingerprint candidate group data processed from the front display image of the electronic device 101 from the AR device 201 in relation to the remaining fingerprint theft prevention service, and transmit the remaining fingerprint candidate group data to the processor 420 (or the remaining fingerprint determination module 4212).

According to one embodiment, the processor 420 of the electronic device 101 may include a fingerprint authentication module 4211, a remaining fingerprint determination module 4212, and a UI providing module 4213. The processor 420 may control the fingerprint authentication module 4211, the remaining fingerprint determination module 4212, and the UI providing module 4213, or may process (or perform) their operations. According to another embodiment, the memory 429 may store instructions for causing the processor 420 to operate the fingerprint authentication module 4211, the remaining fingerprint determination module 4212, and the UI providing module 4213. The instructions may be stored as software on memory 429 and executable by processor 420.

According to yet another embodiment, the fingerprint authentication module 4211 may store and manage a user's fingerprint authentication template for determining success or failure of fingerprint authentication of information sensed by a fingerprint recognition sensor (not shown), in the memory 429.

According to still another embodiment, the fingerprint authentication module 4211 may acquire fingerprint image data by image-processing a signal transmitted from a fingerprint recognition sensor or image sensor, and compare the fingerprint image data with the fingerprint authentication template (or the fingerprint authentication data) registered in the memory to determine whether fingerprint authentication is successful. The fingerprint authentication module 4211 may, for example, determine that the fingerprint authentication has succeeded when the feature point included in the fingerprint image data substantially matches that of the registered fingerprint authentication template, and determine that the fingerprint authentication has failed when the feature points do not match each other.

According to various embodiments, the electronic device 101 may receive the front display image from the AR device 201. When original data of the front display image is received from the AR device 201, the electronic device 101 may transmit the original data of the front display image to the fingerprint authentication module 4211, perform image-processing into an amplitude image corresponding to the front display image through the fingerprint authentication module 4211, and process remaining fingerprint candidate group data related to at least one fingerprint candidate area from the amplitude image.

In an embodiment, the remaining fingerprint determination module 4212 may match the remaining fingerprint candidate group data transmitted from the AR device 201 with the fingerprint authentication template registered in the electronic device to determine authentication validity of the fingerprint candidate area.

In another embodiment, the remaining fingerprint determination module 4212 may determine the similarity between feature point data (or a cropped phase image) of each fingerprint candidate area and feature point data of the registered fingerprint authentication template to calculate a similarity score of the fingerprint candidate area.

The remaining fingerprint determination module 4212 may determine a security level obtained by evaluating the security risk of the fingerprint candidate area by discriminating the similarity score of the fingerprint candidate area according to a configured threshold. In an example, the remaining fingerprint determination module 4212 may divide the thresholds into a first level (e.g., a first threshold), a second level (e.g., a second threshold), and a third level (e.g., a third threshold), and determine, when the similarity score is less than the first threshold, this case to be a low security level. In another example, the remaining fingerprint determination module 4212 may determine, when the similarity score is between the first threshold and less than the second level, this case to be a normal security level, and determine, when the similarity score is equal to or higher than the third level, this case to be a dangerous security level.

According to one embodiment, the remaining fingerprint determination module 4212 may configure matching information obtained by evaluating the security risk level (e.g., security level) according to the authentication validity determination of the remaining fingerprint candidate group data, and transmit the matching information to the communication module 423 so that the matching information is transmitted to the AR device 201.

According to another embodiment, the matching information may include number information assigned to each fingerprint candidate area, coordinate information, and security level information according to the similarity score, but is not limited thereto. For example, the matching information may be configured as in Table 2.

TABLE 2

| 1 | First coordinate information | First score | Normal level |

TABLE 2-continued

| 2 | Second coordinate information | Second score | Dangerous level |
| 3 | Third coordinate information | Third score | Normal level |

According to yet another embodiment, the UI providing module 4213 may display information related to the remaining fingerprint theft prevention service or control the operation of the display. In an example, the UI providing module 4213 may control a display screen to be turned off or to be displayed in black when the remaining fingerprint theft prevention service is executed in conjunction with the AR device 201. Since the display 427 of the electronic device 101 is displayed in black, when the AR device 201 captures the front surface of the display of the electronic device 101, the detection rate of remaining fingerprints may be increased.

According to various embodiments, when the AR device 201 provides security guidance information of the remaining fingerprints based on the security level of the fingerprint candidate area as an AR service, the UI providing module 4213 may control the display screen to be displayed in black. According to other embodiments, the UI providing module 4213 may independently display the security guidance information of the remaining fingerprints on the display of the electronic device 101.

On the other hand, it is possible to intentionally induce removal of the remaining fingerprints in a specific area where the fingerprint sensor is disposed, but this is only possible for remaining fingerprints according to a fingerprint authentication attempt, that is, fingerprints generated while using an electronic device, that is, remaining fingerprints for the entire display. Accordingly, it is difficult to remove fingerprints generated during the use of the electronic device, that is, remaining fingerprints on the entire display.

An external camera may, for example, be required to determine whether the remaining fingerprints are present on the entire display.

As a device (hereinafter referred to as an AR device) supporting an augmented reality (AR) or mixed reality (MR) service, wearable electronic devices that may be worn on the body (e.g., head-mounted devices, head-mounted displays, or AR glasses) are being recently developed.

In an embodiment, the AR device is basically equipped with a camera, and an image acquired through the camera of the AR device may be processed through image processing.

According to some embodiments, the AR device may be used to detect remaining fingerprints that exist on the entire display of an electronic device (e.g., a main device or a control device), and prevent fingerprint theft by determining user authentication possibility or validity for the remaining fingerprints in conjunction with the electronic device.

An electronic device, method, and non-transitory computer-readable storage medium according to various embodiments may use an image acquired from an external electronic device (e.g., an AR device) to determine whether fingerprints remaining on the front surface of the display may be authenticated, and inform the user of the security risk level in conjunction with the external device, thereby preventing fingerprint theft in advance and protecting user personal information.

An electronic device (e.g., an electronic devices 101 of FIGS. 1, 3, and 4) according to an embodiment may include a display (e.g., a display module 160 of FIG. 1 or the display 427 of FIG. 4), a communication module (e.g., a communication module 190 of FIG. 1 or the AR communication module 413 of FIG. 4), a memory (e.g., a memory 120 of FIG. 1 or a memory 429 of FIG. 4), and a processor (e.g., a processor 120 of FIG. 1 or a processor 420 of FIG. 4) configured to be operatively connected to the display, the communication module, and the memory, wherein the processor may be configured to detect, in a state of being wirelessly connected to an augmented reality (AR) device (e.g., an AR devices 201 of FIGS. 2, 3, 4, and 8) through the communication module, the occurrence of an event for executing a remaining fingerprint theft prevention service that is in conjunction with the AR device, to receive, from the AR device through the communication module, remaining fingerprint candidate group data corresponding to a fingerprint candidate area acquired from a display front image of the electronic device captured by a camera of the AR device, to determine authentication validity of the fingerprint candidate area by matching the remaining fingerprint candidate group data with a fingerprint authentication template registered in the electronic device, to transmit, to the AR device through the communication module, a security level obtained by evaluating the security risk of remaining fingerprints remaining on the display of the electronic device as a result of the authentication validity, and to output security guidance information on the remaining fingerprints of the display as an AR service through the AR device.

For example, the electronic device may further include a fingerprint recognition sensor, wherein the memory may store the fingerprint authentication template as a criterion for determining authentication success or authentication failure based on biometric information recognized through the fingerprint recognition sensor in the memory.

In an embodiment, the processor may be configured to turn off the display for a predetermined period of time or display a black screen on the display based on detection of a camera photographing event related to the remaining fingerprint theft prevention service in conjunction with the AR device.

In another embodiment, the event for executing the remaining fingerprint theft prevention service that is in conjunction with the AR device may occur based on reception of a remaining fingerprint theft prevention service execution signal from the AR device through the communication module.

In yet another embodiment, the event for executing the remaining fingerprint theft prevention service that is in conjunction with the AR device may occur based on a fingerprint authentication attempt being performed through the fingerprint recognition sensor.

In still another embodiment, the event for executing the remaining fingerprint theft prevention service that is in conjunction with the AR device may occur based on the fact that a fingerprint authentication attempt is performed more than a predetermined number of times through the fingerprint recognition sensor.

The processor may, for example, be configured to transmit resolution information of the fingerprint recognition sensor to the AR device through the communication module based on the occurrence of the event for executing the remaining fingerprint theft prevention service that is in conjunction with the AR device.

According to another embodiment, the remaining fingerprint candidate group data may include number information assigned to a fingerprint candidate area having a valid fingerprint pattern based on an amplitude image corresponding to the display front image of the electronic device, feature point data of the fingerprint candidate area, and information on coordinates in which the fingerprint candidate area is located within the display front image of the electronic device.

According to yet another embodiment, the processor may be configured to calculate a similarity score by determining similarity between feature point data of the fingerprint candidate area included in the remaining fingerprint candidate group data and feature points of the fingerprint authentication template registered in the memory, to determine the security level by discriminating the calculated similarity score based on predetermined thresholds, and to transmit the determined security level together with the number and coordinate information assigned to each of the fingerprint candidate areas to the AR device.

According to still another embodiment, the processor may be configured to turn off the display for a predetermined period of time or display a black screen on the display in response to a signal in which the AR device provides the security guidance information of the remaining fingerprints as the AR service.

According to an embodiment, an AR device (e.g., AR devices 201 of FIGS. 2, 3, 4, and 8) may include a camera (e.g., a camera 270 of FIG. 2, a AR camera 415 of FIG. 4, and a AR camera 815 of FIG. 8), a communication module (e.g., a communication module 210 of FIG. 2, an AR communication module 413 of FIG. 4, and an AR communication module 813 of FIG. 8), a memory (e.g., a memory 230 of FIG. 2, a AR memory 419 of FIG. 4, and a AR memory 819 of FIG. 8), and a processor (e.g., a processor 220 of FIG. 2, an AR processor 410 of FIG. 4, and an AR processor 810 of FIG. 8) configured to be operatively connected to the camera, the communication module, and the memory, wherein the processor may be configured to detect, in a state of being wirelessly connected to an electronic device (e.g., electronic devices 101 of FIGS. 1, 3, and 4) through the communication module, the occurrence of an event for executing a remaining fingerprint theft prevention service that is in conjunction with the AR device, to acquire a display front image of the electronic device captured through the camera based on the event for executing the remaining fingerprint theft prevention service, to configure remaining fingerprint candidate group data based on a fingerprint candidate area related to remaining fingerprints remaining on the display of the electronic device by processing the display front image, to determine authentication validity of the fingerprint candidate area by matching the remaining fingerprint candidate group data with a fingerprint authentication template of the electronic device when the fingerprint authentication template of the electronic device is stored in the memory, to provide security guidance information for informing the security risk of the remaining fingerprints remaining on the display of the electronic device as an AR service according to a security level of the fingerprint candidate area as a result of the authentication validity, and to transmit the remaining fingerprint candidate group data to the electronic device when the fingerprint authentication template of the electronic device is not stored in the memory.

According to one embodiment, the camera may be at least one of an optical sensor, a UV camera, or an RGB camera, or a camera combining them.

According to another embodiment, the processor may be configured to generate an amplitude image by performing image processing on the display front image of the electronic device, to detect a fingerprint candidate area having feature points of fingerprints from the amplitude image, to assign numbers to the detected fingerprint candidate area, to calculate information on coordinates in which the fingerprint candidate area is located on the display front image, and to extract feature point data of the fingerprint candidate area to configure the remaining fingerprint candidate group data.

According to still another embodiment, the processor may be configured to determine similarity between the feature point data of the fingerprint candidate area included in the remaining fingerprint candidate group data and feature points of a fingerprint authentication template registered in the memory to calculate a similarity score when the fingerprint authentication template is stored in the memory, to determine a security level by discriminating the calculated similarity score based on predetermined thresholds, and to provide the security guidance information as the AR service based on the determined security level.

According to yet another embodiment, when the fingerprint authentication template of the electronic device is not stored in the memory, the processor may be further configured to request transmission of the fingerprint authentication template of the electronic device from the electronic device or a server without transmitting the remaining fingerprint candidate group data to the electronic device, and to receive the fingerprint authentication template of the electronic device from the electronic device or the server.

Figure 6:
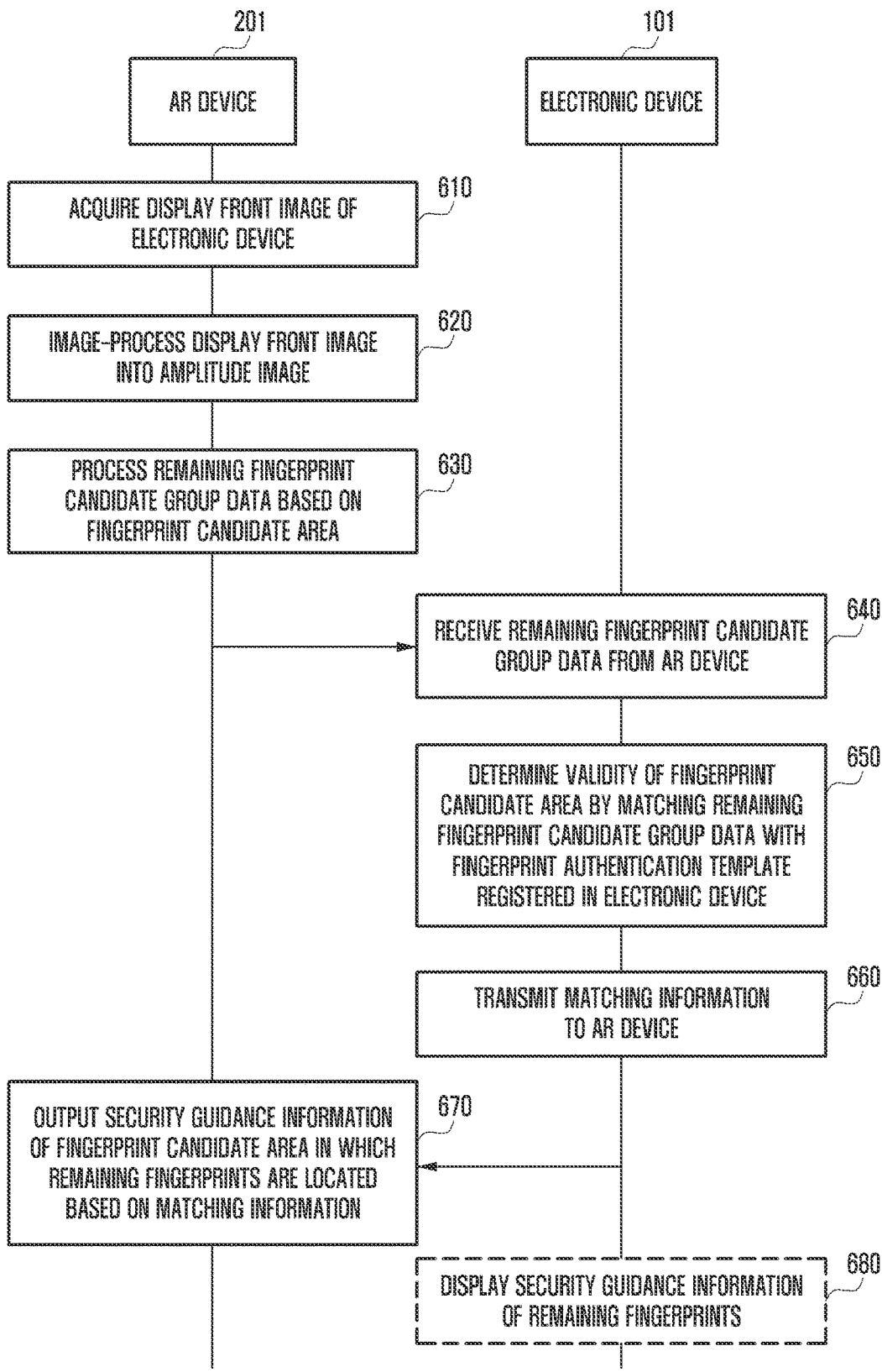
FIG. 6 illustrates a fingerprint theft prevention method using an AR device and an electronic device according to an embodiment of the disclosure.

FIG. 6 illustrates a fingerprint theft prevention method using the AR device 201 and the electronic device 101 according to an embodiment of the disclosure.

In the following embodiments, respective operations may be sequentially performed, but not necessarily sequentially performed. For example, the order of the respective operations may be changed, or at least two operations may be performed in parallel.

According to an embodiment, it can be understood that operations 610 to 680 may be performed by a processor (e.g., a processor 220 of FIG. 2 or an AR processor 410 of FIG. 4) of an AR device 201 or a processor (e.g., a processor 120 of FIG. 1 or a processor 420 of FIG. 4) of an electronic device 101.

Referring to FIG. 6, in operation 610, an AR device 201 (e.g., an AR device 201 of FIG. 2 or an AR device 201 of FIG. 4) may acquire a display front image (e.g., a display front image 510 of FIG. 5) of an electronic device 101 based on a user input or occurrence of a designated event.

In an embodiment, the AR device 201 may activate a camera (e.g., a rear camera, an optical sensor, a UV camera, or an RGB camera) that supports fingerprint capture in the AR device 201 according to a user input (e.g., an input for selecting a camera execution item), and acquire the display front image by capturing (e.g., an input for selecting a photographing item) the front surface of the display of the electronic device 101.

In another embodiment, the AR device 201 may complete a connection with the electronic device 101 through a wireless network (e.g., short-range communication) based on the location of the electronic device 101 within a short-range communication distance, automatically execute the camera in response to a state in which a wireless communication connection with the electronic device 101 is completed, and acquire the display front image by capturing the front surface of the display of the electronic device 101. When wireless communication is connected between the electronic device 101 and the AR device 201 through an encryption code (e.g., a barcode or QR code) displayed on the display of the electronic device 101, the AR device 201 may acquire the display front image by capturing the front surface of the display of the electronic device 101.

According to yet another embodiment, the AR device 201 may automatically execute the camera in response to reception of a signal for executing a fingerprint theft prevention service (e.g., a fingerprint theft prevention service-execution input signal in the AR device 201, a notification signal for capturing the display of the wirelessly connected electronic device 101 from the electronic device 101, a notification signal for notifying that fingerprint authentication has been performed from the electronic device 101), and acquire the display front image by capturing the front surface of the display of the electronic device 101. In another example, the electronic device 101 may transmit the signal for executing the fingerprint theft prevention service to the AR device 201 connected to the electronic device 101 whenever fingerprint authentication is performed, or transmit the signal for executing the fingerprint theft prevention service to the AR device 201 at a time point when the electronic device 101 attempts fingerprint authentication more than a certain number of times.

According to still another embodiment, the AR device 201 may output (e.g., output a sound or display a message on the display) guidance information for capturing the display of the electronic device 101 when the camera is executed. The user may acquire the display front image by capturing the front surface of the display of the electronic device 101 through the guidance information.

The AR device 201 may transmit guidance information for attempting to capture fingerprints to the electronic device 101 at the time of capturing the fingerprints with the camera. For example, when the guidance information is received from the AR device 201, the electronic device 101 may turn off the display or change the background screen to black to assist the capturing operation in the AR device 201. Conversely, when the electronic device 101 transmits the signal for executing the fingerprint theft prevention service to the AR device 201, the electronic device 101 may turn off the display or change the background screen to black to assist the capturing operation in the AR device 201.

In operation 620, the AR device 201 may, for example, image-process the display front image of the electronic device 101 into an amplitude image. The AR device 201 may perform image processing (e.g., contrast enhancement) on the display front image acquired through a camera (e.g., a photodetector {or image sensor}) that supports fingerprint capture, thereby obtaining an amplitude image (e.g., an amplitude fingerprint image) including amplitude A(x,y) information indicating a difference in light intensity (e.g., reflectivity or transmittance) in ridge and valley portions.

In operation 630, the AR device 201 may, for example, detect at least one fingerprint candidate area from the amplitude image corresponding to the display front image, and process the amplitude image into remaining fingerprint candidate group data based on the fingerprint candidate area.

For example, the AR device 201 may perform learning (e.g., deep learning) on feature points (e.g., a ridge that rises in the shape of a line, a valley between the ridges, a bifurcation where the ridge diverges, and an ending where the ridge ends) of fingerprints within the amplitude image to detect (or find) a fingerprint candidate area corresponding to a fingerprint expression pattern or a fingerprint shape, thereby extracting data of the fingerprint candidate area.

According to another embodiment, the AR device 201 may configure the remaining fingerprint candidate group data related to the at least one fingerprint candidate area detected from the amplitude image. The remaining fingerprint candidate group data may include number information assigned for identification, feature point data and coordinate information of the fingerprint candidate area, but may also include other information required for fingerprint authentication. In an example, as shown in Table 1 described with reference to FIG. 4, the AR device 201 may assign a number to each fingerprint candidate area, and acquire coordinate information in which each fingerprint candidate area is located in the display front image and feature point data of the fingerprint candidate area to configure the remaining fingerprint candidate group data.

According to yet another embodiment, the AR device 201 may transmit the remaining fingerprint candidate group data to the electronic device 101 through an AR communication module (e.g., the AR communication module 413 of FIG. 4).

In operation 640, the electronic device 101 may, for example, receive the remaining fingerprint candidate group data transmitted from the AR device 201.

In operation 650, the electronic device 101 may, for example, match the remaining fingerprint candidate group data transmitted from the AR device 201 with a fingerprint authentication template registered in the electronic device 101 to determine authentication validity of the fingerprint candidate area.

In an example, the electronic device 101 may calculate a similarity score of the fingerprint candidate area by determining the similarity between the feature point data (or a cropped phase image) of each fingerprint candidate area and the feature points of the registered fingerprint authentication template. The electronic device 101 may determine a security level obtained by evaluating the security risk of the fingerprint candidate area by discriminating the similarity score of the fingerprint candidate area according to a predetermined threshold. In another example, the electronic device 101 may divide the thresholds into a first level (e.g., a first threshold), a second level (e.g., a second threshold), and a third level (e.g., a third threshold), and determine, when the similarity score is less than the first threshold, this case to be a low security level. The electronic device 101 may determine, when the similarity score is between the first threshold and less than the second level, this case to be a normal security level, and determine, when the similarity score is equal to or higher than the third level, this case to be a dangerous security level.

In operation 660, the electronic device 101 may configure matching information for determining the validity of the remaining fingerprint candidate group data, and transmit the matching information to the AR device 201.

According to one embodiment, the matching information may include number information assigned to each fingerprint candidate area, coordinate information, similarity score, and security level information, but is not limited thereto. In an example, as shown in Table 2 described with reference to FIG. 4, the electronic device 101 may configure matching information obtained by evaluating the security risk (e.g., security level) according to the authentication validity determination of the remaining fingerprint candidate group data.

In operation 670, the AR device 201 may, for example, output security guidance information of remaining fingerprints based on the security risk level of the fingerprint candidate area based on the matching information transmitted from the electronic device 101, as the AR service.

The AR device 201 may confirm the location of the fingerprint candidate area by referring to the coordinate information of each fingerprint candidate area within a camera preview image (e.g., an image obtained by capturing the front surface {e.g., display area} of the electronic device 101) executed in conjunction with the electronic device 101, and output virtual information (e.g., virtual object) for outputting security guidance information (e.g., text such as "This fingerprint can be authenticated", "This fingerprint is highly likely to be authenticated", "Please remove remaining fingerprints", or "There is no fingerprint that can be authenticated") at the location of the remaining fingerprints corresponding to the display of the electronic device 101.

In parallel or independently in operation 680, the electronic device 101 (680) may, for example, output the security guidance information of the remaining fingerprints based on the security level of the fingerprint candidate group data, to the display.

According to some embodiments, operation 680 may be omitted.

Figure 7:
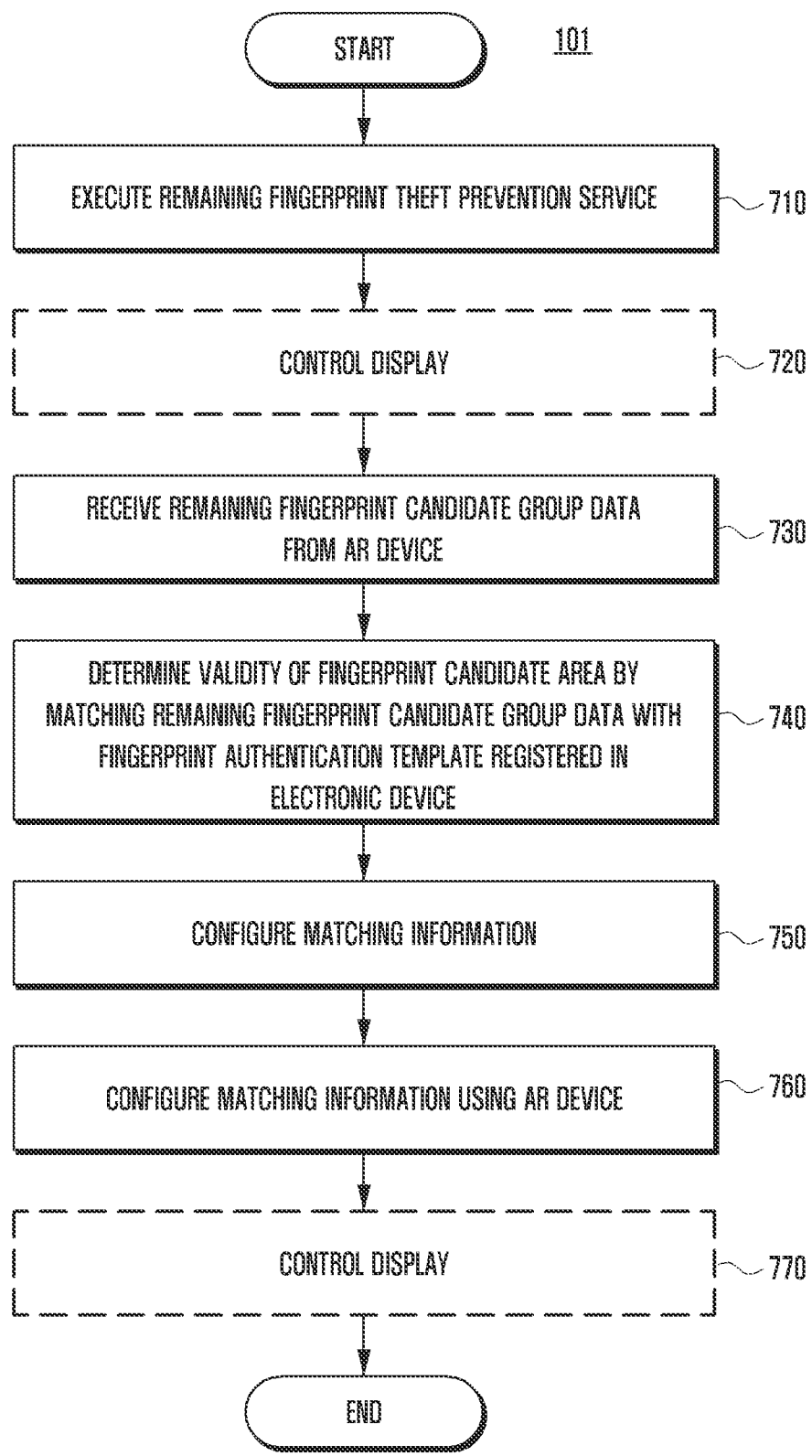
FIG. 7 illustrates a fingerprint theft prevention method using an AR device and an electronic device according to an embodiment of the disclosure.

FIG. 7 illustrates a fingerprint theft prevention method using the AR device 201 and the electronic device 101 according to an embodiment of the disclosure.

In the following embodiments, respective operations may be sequentially performed, but not necessarily sequentially performed. For example, the order of the respective operations may be changed, or at least two operations may be performed in parallel.

According to one embodiment, it can be understood that operations 710 to 770 may be performed by a processor (e.g., a processor 120 of FIG. 1 or a processor 420 of FIG. 4) of an electronic device 101 (e.g., an electronic device 101 of FIG. 1).

Referring to FIG. 7, in operation 710, the electronic device 101 (e.g., the electronic device 101 of FIG. 1 or the electronic device 101 of FIG. 4) according to an embodiment may detect execution of a remaining fingerprint theft prevention service.

According to another embodiment, the electronic device 101 and the AR device 201 (e.g., the AR device 201 of FIG. 3 or the AR device 201 of FIG. 4) may support ON/OFF of the remaining fingerprint theft prevention service function.

According to yet another embodiment, in the electronic device 101 and the AR device 201, execution conditions of the remaining fingerprint theft prevention service may be configured in various ways. The execution conditions of the remaining fingerprint theft prevention service may be configured as, for example, a time point when the wireless communication connection with the AR device 201 is completed, a time point when fingerprint authentication is performed in the electronic device 101, and a time point when fingerprint authentication is performed more than a certain number of times in the electronic device 101, but is not limited thereto.

For example, the electronic device 101 may receive a signal notifying that the remaining fingerprint theft prevention service has been executed from the AR device 201.

In operation 720, the electronic device 101 may control the display to assist the capturing operation of the camera in relation to the remaining fingerprint theft prevention service.

For another example, the electronic device 101 may control the display to be turned off for a predetermined period of time or the display screen to be displayed in black.

According to various embodiments, operation 720 may be omitted.

In operation 730, the electronic device 101 may receive remaining fingerprint candidate group data from the AR device 201 through a communication module (e.g., the communication module 423 of FIG. 4).

According to one embodiment, the remaining fingerprint candidate group data may include information (e.g., number information, feature point data, and coordinate information) corresponding to a fingerprint candidate area related to remaining fingerprints remaining on the display through a display front image of the electronic device 101 which is captured by a camera (e.g., an AR camera) of the AR device 201 (i.e., an external device). The electronic device 101 may receive the remaining fingerprint candidate group data configured as shown in Table 1 described with reference to FIG. 4.

In operation 740, the electronic device 101 may, for example, match the remaining fingerprint candidate group data transmitted from the AR device 201 with a fingerprint authentication template registered in the electronic device 101 to determine authentication validity of the fingerprint candidate area.

For example, the electronic device 101 may calculate a similarity score of the fingerprint candidate area by determining the similarity between the feature point data (or a cropped phase image) of each fingerprint candidate area and feature points of the registered fingerprint authentication template. In an embodiment, the electronic device 101 may determine a security level of the fingerprint candidate area by discriminating the similarity score of the fingerprint candidate area according to a predetermined threshold.

In operation 750, the electronic device 101 may configure matching information for determining the validity of the remaining fingerprint candidate group data. In an embodiment, the matching information may include number information assigned to each fingerprint candidate area, coordinate information, similarity score, and security level information. For example, as shown in Table 2 described with reference to FIG. 4, the electronic device 101 may configure the matching information obtained by evaluating the security risk (e.g., security level) according to the authentication validity determination of the remaining fingerprint candidate group data.

In operation 760, the electronic device 101 may, for example, transmit the matching information to the AR device 201 through a communication module (e.g., the communication module 423 of FIG. 4).

In operation 770, the electronic device 101 may, for example, control the display screen to be displayed as a black screen when the AR device 201 provides security guidance information on the remaining fingerprints based on the security level of the fingerprint candidate area as an AR service. The electronic device 101 may display the security guidance information of the remaining fingerprints on the display so as to overlap with AR information.

According to some embodiments, operation 770 may be omitted.

Figure 8:
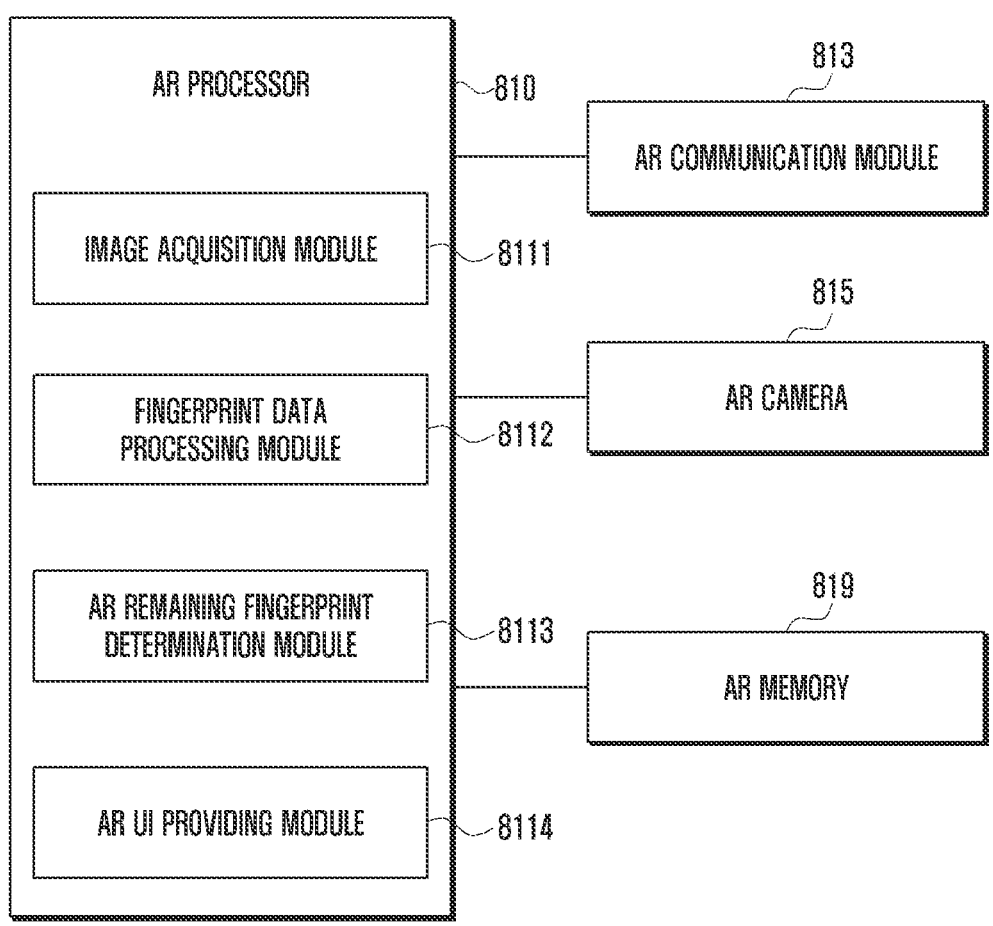
FIG. 8 illustrates components of an AR device according to an embodiment of the disclosure.

FIG. 8 illustrates components of the AR device 201 according to an embodiment of the disclosure.

Referring to FIG. 8, an AR device 201 according to an embodiment that supports a remaining fingerprint theft prevention service may include an AR communication module 813, an AR camera 815, an AR memory 819, and an AR processor 810. The operations of the AR device 201 described in FIG. 4 may also be applied to FIG. 8.

The AR processor 810 of the AR device 201 shown in FIG. 8 may include an image acquisition module 8111, a fingerprint data processing module 8112, an AR remaining fingerprint determination module 8113, and an AR UI providing module 8114. According to various embodiments, the AR device 201 may further include a fingerprint authentication module (not shown).

In an embodiment, the AR processor 810 may control the image acquisition module 8111, the fingerprint data processing module 8112, the AR remaining fingerprint determination module 8113, and the AR UI providing module 8114, or process (or perform) their operations. In another embodiment, the AR memory 819 may store instructions that cause the AR processor 810 to operate the image acquisition module 8111, the fingerprint data processing module 8112, the AR remaining fingerprint determination module 8113, and the AR UI providing module 8114. The instructions may be stored as software on the AR memory 819 and may be executable by the AR processor 810.

In yet another embodiment, the image acquisition module 8111 may receive a captured image from the AR camera 815. For example, the image acquisition module 8111 may receive a display front image of the electronic device 101 in relation to the remaining fingerprint theft prevention service. The image acquisition module 8111 may transmit the display front image to the fingerprint data processing module 8112.

In still another embodiment, the fingerprint data processing module 8112 may generate an amplitude image (e.g., an amplitude fingerprint image) by performing image processing (e.g., contrast enhancement) on the display front image.

The fingerprint data processing module 8112 may process the amplitude image into remaining fingerprint candidate group data related to at least one fingerprint candidate area. The fingerprint data processing module 8112 may detect one or more fingerprint candidate areas from the amplitude image. For example, the fingerprint data processing module 8112 may perform learning (e.g., deep learning) on feature points (e.g., a ridge that rises in the shape of a line, a valley between the ridges, a bifurcation where the ridge diverges, and an ending where the ridge ends) of fingerprints within the amplitude image to detect (or find) a fingerprint candidate area where a fingerprint expression pattern or a fingerprint shape appears, and acquire data of the detected fingerprint candidate area.

According to one embodiment, the fingerprint data processing module 8112 may assign numbers to the fingerprint candidate areas, and acquire coordinate information in which each fingerprint candidate area is located in the display front image and data (e.g., feature point data) of the fingerprint candidate area to process the acquired information into remaining fingerprint candidate group data. For example, the remaining fingerprint candidate group data may be configured as shown in Table 1 described in FIG. 4.

According to another embodiment, the AR remaining fingerprint determination module 8113 may determine whether a fingerprint authentication template (or data) registered in the electronic device 101 connected to the AR device 201 is stored in the AR device 201.

According to still another embodiment, when the fingerprint authentication template of the electronic device 101 is stored in the AR device 201, the AR remaining fingerprint determination module 8113 may match the remaining fingerprint candidate group data with the fingerprint authentication template of the electronic device 101 stored in the AR device 201 to determine the authentication validity of the fingerprint candidate area. The AR remaining fingerprint determination module 8113 may configure matching information obtained by evaluating the security risk level (e.g., security level) according to the authentication validity determination of the remaining fingerprint candidate group data. In an example, the AR remaining fingerprint determination module 8113 may calculate a similarity score by determining the similarity between the feature point data (or a cropped phase image) of each fingerprint candidate area and the feature points of the registered fingerprint authentication template, and determine the security level obtained by evaluating the security risk of the fingerprint candidate area by discriminating the similarity score according to a predetermined threshold. In another example, the AR remaining fingerprint determination module 8113 may transmit the security level of the fingerprint candidate area to the AR UI providing module 8114.

When the fingerprint authentication template of the electronic device 101 is not stored in the AR device 201, the AR remaining fingerprint determination module 8113 may transmit the remaining fingerprint candidate group data to the electronic device 101, and request determination of the validity of the remaining fingerprint candidate group data. When matching information according to the determination of the validity of the remaining fingerprint candidate group data is received from the electronic device 101, the AR device 201 may output security guidance information of the remaining fingerprints as an AR service through the AR UI providing module 8114.

In an embodiment, when the fingerprint authentication template of the electronic device 101 is not stored in the AR device 201, the AR remaining fingerprint determination module 8113 may request transmission of the fingerprint authentication template of the electronic device 101 from the electronic device 101 or a server (e.g., the server 108 of FIG. 1) without transmitting the remaining fingerprint candidate group data to the electronic device 101. When the fingerprint authentication template of the electronic device 101 is received from the electronic device 101 or the server in response to a request signal, the AR remaining fingerprint determination module 8113 may determine the validity of the remaining fingerprint candidate group data based on the received fingerprint authentication template of the electronic device 101.

In another embodiment, the AR UI providing module 8114 may receive matching the information related to the remaining fingerprint candidate group data from the electronic device 101 through the AR communication module 813, or output security guidance information of remaining fingerprints remaining on the display of the electronic device 101 as an AR service based on the security level of the fingerprint candidate area determined through the AR remaining fingerprint determination module 8113. The security guidance information may, for example, be information that induces removal of the remaining fingerprints, information informing about the risk of the remaining fingerprints, or information informing that the remaining fingerprints do not exist.

In an example, the AR UI providing module 8114 may confirm the location of the fingerprint candidate area by referring to the coordinate information of each fingerprint candidate area within a camera preview image (e.g., an image obtained by capturing the front surface {e.g., the display area} of the electronic device 101) executed in conjunction with the electronic device 101, and output virtual information (or a virtual object) for outputting security guidance information (e.g., text such as "This fingerprint can be authenticated", "This fingerprint is highly likely to be authenticated", "Please remove remaining fingerprints", or "There is no fingerprint that can be authenticated") at the location of the remaining fingerprints corresponding to the display of the electronic device 101. In another example, the AR UI providing module 8114 may overlay a UI (e.g., a virtual fingerprint-shaped object or a security risk object) that informs the location of the fingerprint candidate area with a normal or dangerous level of security risk, on the camera preview image and output the overlayed image.

The AR device 201 may independently evaluate the security risk of the remaining fingerprints remaining on the front surface of the display in various environments in which a lock device is unlocked through fingerprint authentication, such as a door lock device, a TV, etc., in addition to the electronic device 101 such as a smartphone, thereby providing security guidance information to the user.

Figure 9:
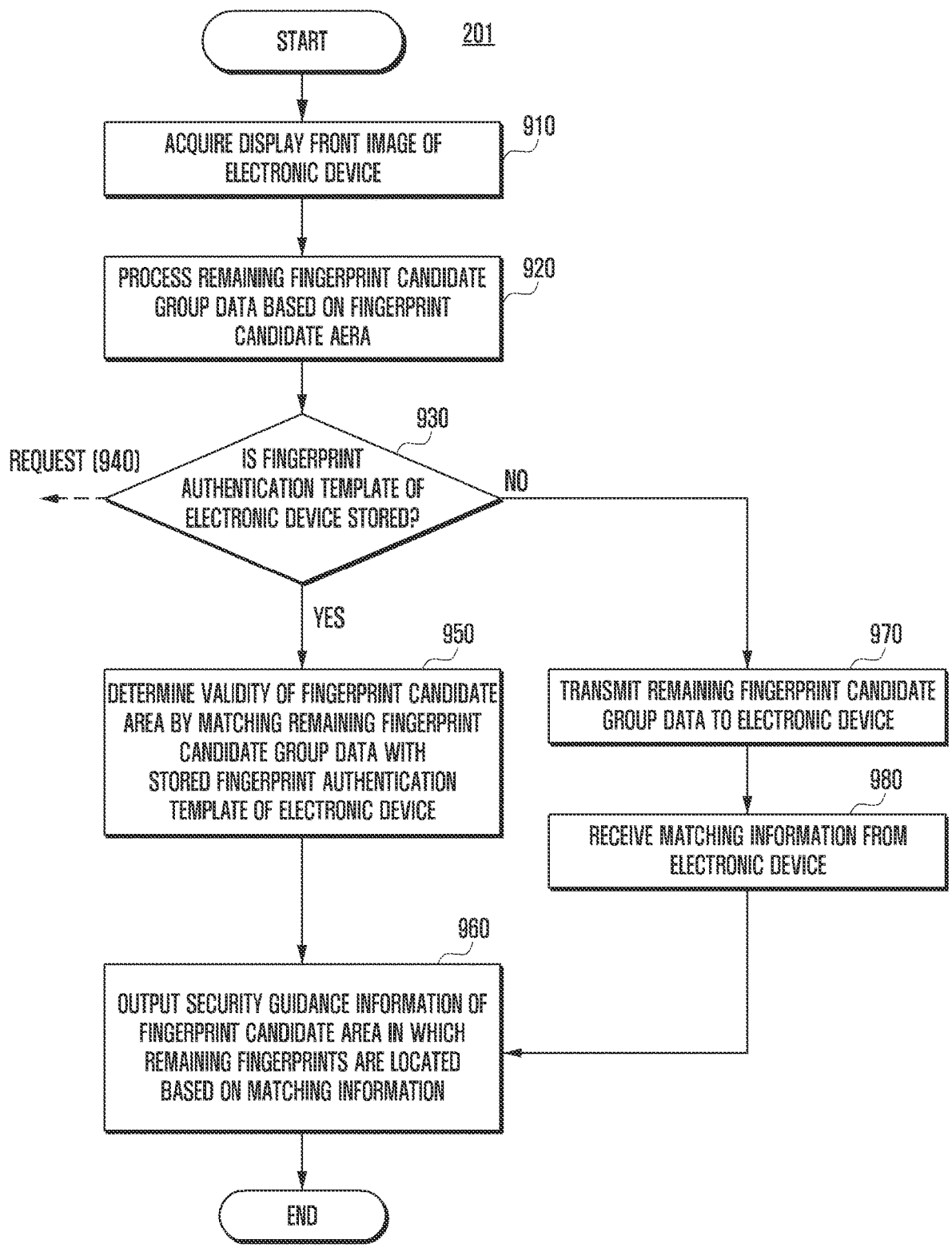
FIG. 9 illustrates a fingerprint theft prevention method of an AR device according to an embodiment of the disclosure.

FIG. 9 illustrates a fingerprint theft prevention method of the AR device 201 according to an embodiment of the disclosure.

In the following embodiments, respective operations may be sequentially performed, but not necessarily sequentially performed. For example, the order of the respective operations may be changed, or at least two operations may be performed in parallel.

According to an embodiment, it can be understood that operations 910 to 980 may be performed by a processor (e.g., a processor 220 of FIG. 2 or an AR processor 410 of FIG. 4) of an AR device 201.

Referring to FIG. 9, according to an embodiment, in operation 910, an AR device 201 (e.g., an AR device 201 of FIG. 2 or an AR device 201 of FIG. 4) may acquire a display front image (e.g., a display front image 510 of FIG. 5) of the electronic device 101 (e.g., an electronic device 101 of FIG. 1 or an electronic device 101 of FIG. 4) based on a user input or the occurrence of a designated event.

For example, the AR device 201 may execute a camera based on the user input or the occurrence of the designated event described in FIG. 6 to capture a front surface of the display of the electronic device 101, thereby acquiring a display front image.

In operation 920, the AR device 201 may, for example, process the display front image of the electronic device 101 into remaining fingerprint candidate group data based on a fingerprint candidate area.

According to an embodiment, the AR device 201 may acquire an amplitude image by performing image processing (e.g., contrast enhancement) on the display front image, and perform learning (e.g., deep learning) on feature points (e.g., a ridge that rises in the shape of a line, a valley between the ridges, a bifurcation where the ridge diverges, and an ending where the ridge ends) of fingerprints within the amplitude image to detect (or find) a fingerprint candidate area where a fingerprint expression pattern or a fingerprint shape appears, and extract data of the fingerprint candidate area. The AR device 201 may, for example, configure remaining fingerprint candidate group data related to at least one fingerprint candidate area detected from the display front image.

According to another embodiment, the remaining fingerprint candidate group data may include number information assigned for identification, feature point data and coordinate information of the fingerprint candidate area, but may also include other information required for fingerprint authentication. In an example, as shown in Table 1 described with reference to FIG. 4, the AR device 201 may assign a number to each fingerprint candidate area, and acquire coordinate information in which each fingerprint candidate area is located in the display front image and the feature point data of the fingerprint candidate area, thereby configuring the remaining fingerprint candidate group data.

In operation 930, the AR device 201 may confirm whether the fingerprint authentication template (or data) of the electronic device 101 connected to the AR device 201 is stored in the AR device 201.

In an example, when a remaining fingerprint theft prevention service is configured in conjunction with the electronic device 101, the AR device 201 may receive the fingerprint authentication template information registered in the electronic device 101 from the electronic device 101 through a communication module (e.g., the communication module 210 of FIG. 2 or the AR communication module 413 of FIG. 4) at the time of being connected to the electronic device 101.

In operation 950, when the fingerprint authentication template of the electronic device 101 is stored, the AR device 201 may match the remaining fingerprint candidate group data with the fingerprint authentication template of the electronic device 101 stored in the AR device 201 to determine the authentication validity of the fingerprint candidate area.

The AR device 201 may, for example, calculate a similarity score by determining the similarity between the feature point data (or a cropped phase image) of each fingerprint candidate area and the feature points of the registered fingerprint authentication template, and determine a security level of the fingerprint candidate area by discriminating the similarity score according to a predetermined threshold.

According to yet another embodiment, the AR device 201 may configure matching information obtained by evaluating the security risk (e.g., security level) according to the authentication validity determination of the remaining fingerprint candidate group data.

In operation 970, when the fingerprint authentication template of the electronic device 101 is not stored, the AR device 201 may transmit the remaining fingerprint candidate group data to a communication module (e.g., the communication module 210 of FIG. 2 or the AR communication module 413 of FIG. 4), and request the validity determination of the remaining fingerprint candidate group data. In operation 980, the AR device 201 may receive the matching information according to the validity determination of the remaining fingerprint candidate group data from the electronic device 101 through a communication module (e.g., the communication module 210 of FIG. 2 or the AR communication module 413 of FIG. 4).

According to various embodiments, when the registered fingerprint authentication template data of the electronic device 101 is not stored according to the configuration of the remaining fingerprint theft prevention service, as shown in operation 940, the AR device 201 may request the fingerprint authentication template information registered in the electronic device 101 from the electronic device 101 (or a server). When the AR device 201 receives the fingerprint authentication template of the electronic device 101 from the electronic device 101 or the server upon the request, operations 950 and 960 may be performed.

In operation 960, the AR device 201 may receive the matching information related to the remaining fingerprint candidate group data from the electronic device 101 through the communication module (e.g., the communication module 210 of FIG. 2 or the AR communication module 413 of FIG. 4), or output security guidance information of remaining fingerprints remaining on the display of the electronic device 101 as an AR service based on the matching information (or security level) determined through the AR remaining fingerprint determination module (e.g., the AR remaining fingerprint determination module 8113 of FIG. 8). In an embodiment, the security guidance information may be information inducing removal of the remaining fingerprints, information informing about the risk of the remaining fingerprints, or information informing that the remaining fingerprints do not exist.

In another embodiment, the AR device 201 may share information that outputs the security guidance information of the remaining fingerprints as the AR service, with the electronic device 101. The electronic device may display a black image by controlling the display screen, or turn the display on for a predetermined period of time to improve visualization of the security guidance information of the remaining fingerprints.

In yet another embodiment, the user may recognize the presence of the remaining fingerprints remaining on the display of the electronic device through the security guidance information on the remaining fingerprints output through the AR service, and wipe the remaining fingerprints remaining on the display.

Figure 10A:
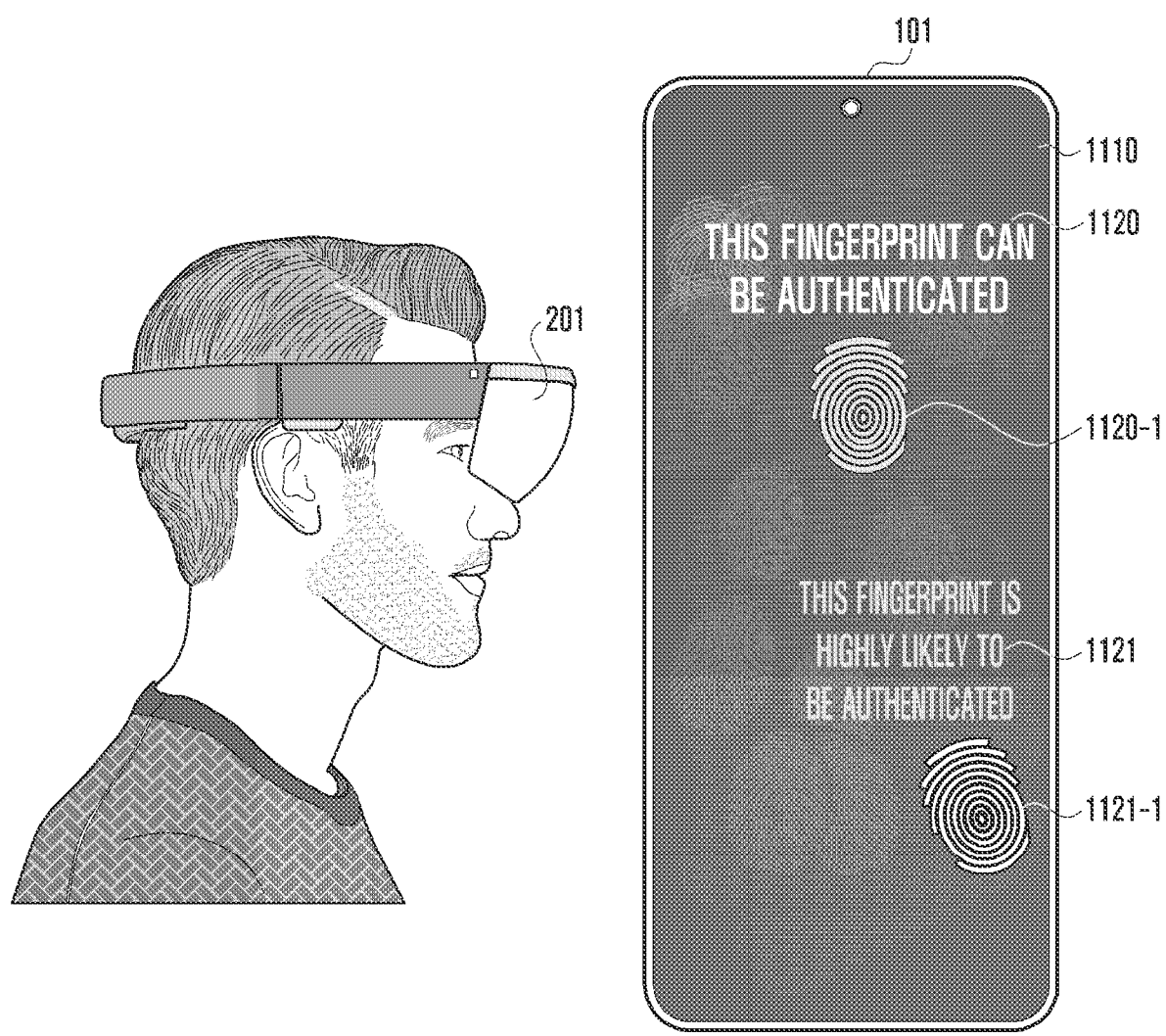
FIGS. 10A and 10B illustrate examples of guidance information for guiding prevention of fingerprint theft for remaining fingerprints on a display of an electronic device according to various embodiments of the disclosure.
Figure 10B:
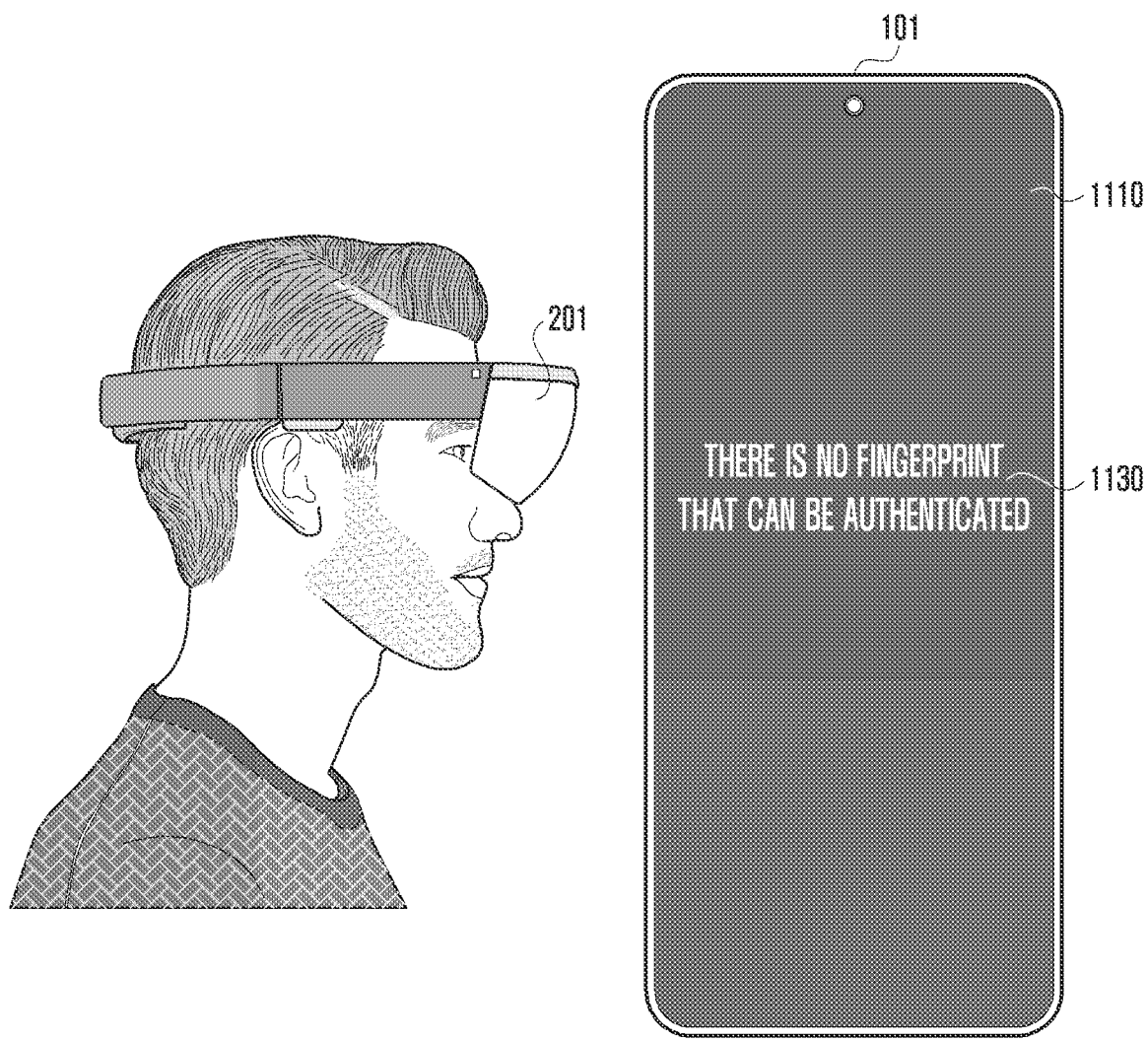

FIGS. 10A and 10B illustrate examples of guidance information for guiding prevention of fingerprint theft for remaining fingerprints on a display of an electronic device according to various embodiments of the disclosure.

Referring to FIGS. 10A and 10B, an AR device 201 and an electronic device 101 that support a remaining fingerprint theft prevention service may induce the remaining fingerprint to be removed or output security guidance information informing the security risk of the remaining fingerprints as an AR service.

In an example, when the remaining fingerprints are analyzed as a normal or dangerous level based on evaluation of the security risk level of remaining fingerprints remaining on a display 1110 of the electronic device 101, the AR device 201 may display a virtual fingerprint object 1120-1 and security guidance information (e.g., "This fingerprint can be authenticate 1120") in a fingerprint candidate area in which the remaining fingerprints evaluated as being the dangerous level remain while overlapping with the display of the electronic device 101 in a camera preview image (e.g., an image obtained by capturing a front surface {e.g., a display area} of the electronic device 101) in conjunction with the electronic device 101, as shown in <10001>, and output a virtual fingerprint object 1121-1 and security guidance information (e.g., "This fingerprint is highly likely to be authenticated 1121") as an AR service in the fingerprint candidate area in which the remaining fingerprints evaluated as being the normal level remain.

In another example, when the remaining fingerprints remaining on the display 1110 of the electronic device 101 is evaluated as being a low security level of the security risk, the AR device 201 may output, as an AR service, security guidance information (e.g., "There is no fingerprint that can be authenticated 1130") that informs that there is no remaining fingerprint that may be authenticated or stolen while overlapping with the display of the electronic device 101 within the camera preview image (e.g., an image obtained by capturing a front surface {e.g., a display area} of the electronic device 101), as shown in <10002>.

When providing information from the AR device 201 as the AR service, the electronic device 101 may control a black screen to be displayed on the display for a certain period of time for visual emphasis.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). In an example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to one embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to some embodiments, each component (e.g., a module or a program) of the above-described components may include a single entity or multiple entities. According to other embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display;
a communication circuit;
memory storing one or more computer programs; and
at least one processor operatively connected to the display, the communication circuit, and the memory,
wherein the one or more computer programs include computer-executable instructions that, when executed by the at least one processor, cause the electronic device to:
receive, from an augmented reality (AR) device through the communication circuit in a state of being wirelessly connected to the AR device through the communication circuit, fingerprint candidate group data corresponding to fingerprints remaining on a front display of the electronic device captured by a camera of the AR device,
determine authentication validity of a fingerprint candidate area by matching the fingerprint candidate group data with a fingerprint authentication template registered in the electronic device, and
transmit, to the AR device through the communication circuit, a security level obtained by evaluating a security risk of the fingerprints remaining on the front display of the electronic device as a result of the authentication validity, such that guidance information relating to the fingerprints remaining on the front display is output.

2. The electronic device of claim 1, further comprising:
a fingerprint recognition sensor,
wherein the memory stores the fingerprint authentication template as a criterion for determining authentication success or authentication failure based on biometric information recognized through the fingerprint recognition sensor in the memory.

3. The electronic device of claim 2,
wherein the one or more computer programs further include computer-executable instructions that, when executed by the at least one processor, cause the electronic device to detect an event for executing a fingerprint theft prevention service that is in conjunction with the AR device, and
wherein the event for executing the fingerprint theft prevention service that is in conjunction with the AR device occurs based on reception of a fingerprint theft prevention service execution signal from the AR device through the communication circuit.

4. The electronic device of claim 3, wherein the event for executing the fingerprint theft prevention service that is in conjunction with the AR device occurs based on a fingerprint authentication attempt being performed through the fingerprint recognition sensor.

5. The electronic device of claim 3, wherein the event for executing the fingerprint theft prevention service that is in conjunction with the AR device occurs based on a fingerprint authentication attempt being performed more than a predetermined number of times through the fingerprint recognition sensor.

6. The electronic device of claim 3, wherein the one or more computer programs further include computer-executable instructions that, when executed by the at least one processor, cause the electronic device to transmit resolution information of the fingerprint recognition sensor to the AR device through the communication circuit based on the event for executing the fingerprint theft prevention service that is in conjunction with the AR device.

7. The electronic device of claim 1, wherein the at least one processor is further configured to turn off the front display for a predetermined period of time or display a black screen on the front display based on detection of a camera photographing event related to a fingerprint theft prevention service in conjunction with the AR device.

8. The electronic device of claim 1, wherein the fingerprint candidate group data comprises:

number information assigned to a fingerprint candidate area having a valid fingerprint pattern based on an amplitude image corresponding to the front display of the electronic device, feature point data of the fingerprint candidate area, and information on coordinates in which the fingerprint candidate area is located within the front display of the electronic device.

9. The electronic device of claim 1, wherein the one or more computer programs further include computer-executable instructions that, when executed by the at least one processor, cause the electronic device to:
calculate a similarity score by determining similarity between feature point data of the fingerprint candidate area included in the fingerprint candidate group data and feature points of the fingerprint authentication template registered in the memory,
determine the security level by discriminating the calculated similarity score based on predetermined thresholds, and
transmit the determined security level together with number and coordinate information assigned to each of the fingerprint candidate areas to the AR device.

10. The electronic device of claim 1, wherein the one or more computer programs further include computer-executable instructions that, when executed by the at least one processor, cause the electronic device to turn off the front display for a predetermined period of time or display a black screen on the front display in response to a signal in which the AR device provides the guidance information of the fingerprints as an AR service.

11. An augmented reality (AR) device comprising:
a camera;
a communication circuit;
memory storing one or more computer programs; and
at least one processor operatively connected to the camera, the communication circuit, and the memory,
wherein the one or more computer programs include computer-executable instructions that, when executed by the at least one processor, cause the AR device to:
acquire a front display image of an electronic device through the camera,
configure fingerprint candidate group data based on a fingerprint candidate area related to fingerprints remaining on a front display of the electronic device,
determine authentication validity of the fingerprint candidate area by matching the fingerprint candidate group data with a fingerprint authentication template of the electronic device in case that the fingerprint authentication template of the electronic device is stored in the memory,
provide security guidance information for informing a security risk of the fingerprints remaining on the front display of the electronic device as an AR service according to a security level of the fingerprint candidate area as a result of the authentication validity, and
transmit the fingerprint candidate group data to the electronic device through the communication circuit in case that the fingerprint authentication template of the electronic device is not stored in the memory.

12. The AR device of claim 11, wherein the camera is at least one of an optical sensor, an ultraviolet (UV) camera, or a red green blue (RGB) camera, or a camera combining them.

13. The AR device of claim 11, wherein the one or more computer programs further include computer-executable instructions that, when executed by the at least one processor, cause the AR device to:
generate an amplitude image by performing image processing on of an image the front display of the electronic device,
detect a fingerprint candidate area having feature points of fingerprints from the amplitude image,
assign numbers to the detected fingerprint candidate area,
calculate information on coordinates in which the fingerprint candidate area is located on the front display, and
extract feature point data of the fingerprint candidate area to configure the fingerprint candidate group data.

14. The AR device of claim 11, wherein the one or more computer programs further include computer-executable instructions that, when executed by the at least one processor, cause the AR device to:
determine similarity between feature point data of the fingerprint candidate area included in the fingerprint candidate group data and feature points of a fingerprint authentication template registered in the memory to calculate a similarity score in case that the fingerprint authentication template is stored in the memory,
determine a security level by discriminating the calculated similarity score based on predetermined thresholds, and
provide the security guidance information as the AR service based on the determined security level.

15. The AR device of claim 11, wherein, in case that the fingerprint authentication template of the electronic device is not stored in the memory, the one or more computer programs further include computer-executable instructions that, when executed by the at least one processor, cause the AR device to:
request transmission of the fingerprint authentication template of the electronic device from the electronic device or a server without transmitting the fingerprint candidate group data to the electronic device, and
receive the fingerprint authentication template of the electronic device from the electronic device or the server.

16. A non-transitory computer-readable storage medium storing one or more computer programs including computer-executable instructions that, when executed by at least one processor of an electronic device, cause the electronic device to perform operations, the operations comprising:
receiving, from an augmented reality (AR) device through a communication circuit in a state of being wirelessly connected to the AR device through the communication circuit, fingerprint candidate group data corresponding to remaining on a front display of the electronic device captured by a camera of the AR device,
determining authentication validity of a fingerprint candidate area by matching the fingerprint candidate group data with a fingerprint authentication template registered in the electronic device, and
transmitting, to the AR device through the communication circuit, a security level obtained by evaluating a security risk of the fingerprints remaining on the front display of the electronic device as a result of the authentication validity such that guidance information relating to the fingerprints remaining on the front display is output.

17. The non-transitory computer-readable storage medium of claim 16, operations further comprising:
storing, via memory, the fingerprint authentication template as a criterion for determining authentication success or authentication failure based on biometric information recognized through a fingerprint recognition sensor in the memory.

18. The non-transitory computer-readable storage medium of claim 17, the operations further comprising:
turning off the front display for a predetermined period of time or display a black screen on the front display based on detection of a camera photographing event related to a fingerprint theft prevention service in conjunction with the AR device.

19. The non-transitory computer-readable storage medium of claim 18,
the operations further comprising:
detecting an event for executing the fingerprint theft prevention service that is in conjunction with the AR device,
wherein the event for executing the fingerprint theft prevention service that is in conjunction with the AR device occurs based on reception of a fingerprint theft prevention service execution signal from the AR device through the communication circuit,
wherein the event for executing the fingerprint theft prevention service that is in conjunction with the AR device occurs based on a fingerprint authentication attempt being performed through the fingerprint recognition sensor, and
wherein the event for executing the fingerprint theft prevention service that is in conjunction with the AR device occurs based on a fingerprint authentication attempt being performed more than a predetermined number of times through the fingerprint recognition sensor.

20. The non-transitory computer-readable storage medium of claim 19,
operations further comprising:
transmitting resolution information of the fingerprint recognition sensor to the AR device through the communication circuit based on an occurrence of the event for executing the fingerprint theft prevention service that is in conjunction with the AR device,
calculating a similarity score by determining similarity between feature point data of the fingerprint candidate area included in the fingerprint candidate group data and feature points of the fingerprint authentication template registered in the memory,
determining the security level by discriminating the calculated similarity score based on predetermined thresholds,
transmitting the determined security level together with a number and coordinate information assigned to each of the fingerprint candidate areas to the AR device, and
turning off the front display for a predetermined period of time or display a black screen on the front display in response to a signal in which the AR device provides the guidance information of the fingerprints as an AR service, and
wherein the fingerprint candidate group data comprises:
number information assigned to a fingerprint candidate area having a valid fingerprint pattern based on an amplitude image corresponding to the front display of the electronic device, and
feature point data of the fingerprint candidate area, and information on coordinates in which the fingerprint candidate area is located within the front display of the electronic device.

* * * * *